United States Patent [19]

Takami

[11] Patent Number: 5,080,642
[45] Date of Patent: Jan. 14, 1992

[54] ROTATION TRANSMISSION DEVICE WITH A TORQUE LIMITING TRANSMISSION GEAR MECHANISM

[75] Inventor: Akira Takami, Himeji, Japan
[73] Assignee: Mitsubishi Denki Kabushiki Kaisha, Tokyo, Japan
[21] Appl. No.: 615,959
[22] Filed: Nov. 20, 1990
[30] Foreign Application Priority Data

Nov. 20, 1989 [JP] Japan .................................. 1-302597
Nov. 28, 1989 [JP] Japan .................................. 1-310387

[51] Int. Cl.⁵ ............................................. F16D 43/20
[52] U.S. Cl. ................................... 475/263; 475/318; 475/330; 475/347
[58] Field of Search ............... 475/263, 317, 318, 330, 475/346, 347

[56] References Cited

U.S. PATENT DOCUMENTS 4,173,059 11/1979 Hashimoto et al. .................. 29/240
4,869,139 9/1989 Gotman ............................... 81/475

*Primary Examiner*—Leslie A. Braun
*Assistant Examiner*—William O. Trousdell
*Attorney, Agent, or Firm*—Sughrue, Mion, Zinn, Macpeak and Seas

[57] ABSTRACT

A rotation transmission device with a torque limiting function comprises a cylindrical housing 10, a first rotation member 20 supported on a first bracket 12 via a one-way clutch bearing 14, a second rotation member 30 integral with the output shaft 33, an annular torsional resilient member 80, and an input shaft 40 rotatably supported on the rotation members 20 and 30. The torque is transmitted from the input shaft to the first rotation member via a torque limiting transmission mechanism which comprises: a first and a second internal gear 21 and 31, a first sun gear 41 supported on the input shaft 40 via a one-way clutch bearing 42, a second sun gear 43 fixed on the input shaft, first and second planetary gears 55 and 65, satellite rings 58 and 68 eccentric to the planetary gears 55, and a guide disk 70 having guide slots 72 slidably engaging with the satellite rings 58 and 68. The first rotation member 20 is driven and rotated by the torque limiting transmission mechanism relative to the second rotation member 30 while the torsional torque of the resilient member 80 is under a predetermined maximum. When the torsional torque of the resilient member 80 reaches the maximum the torque limiting transmission mechanism rotates freely without transmitting torque to the first rotation member 20.

7 Claims, 16 Drawing Sheets

FIG. I

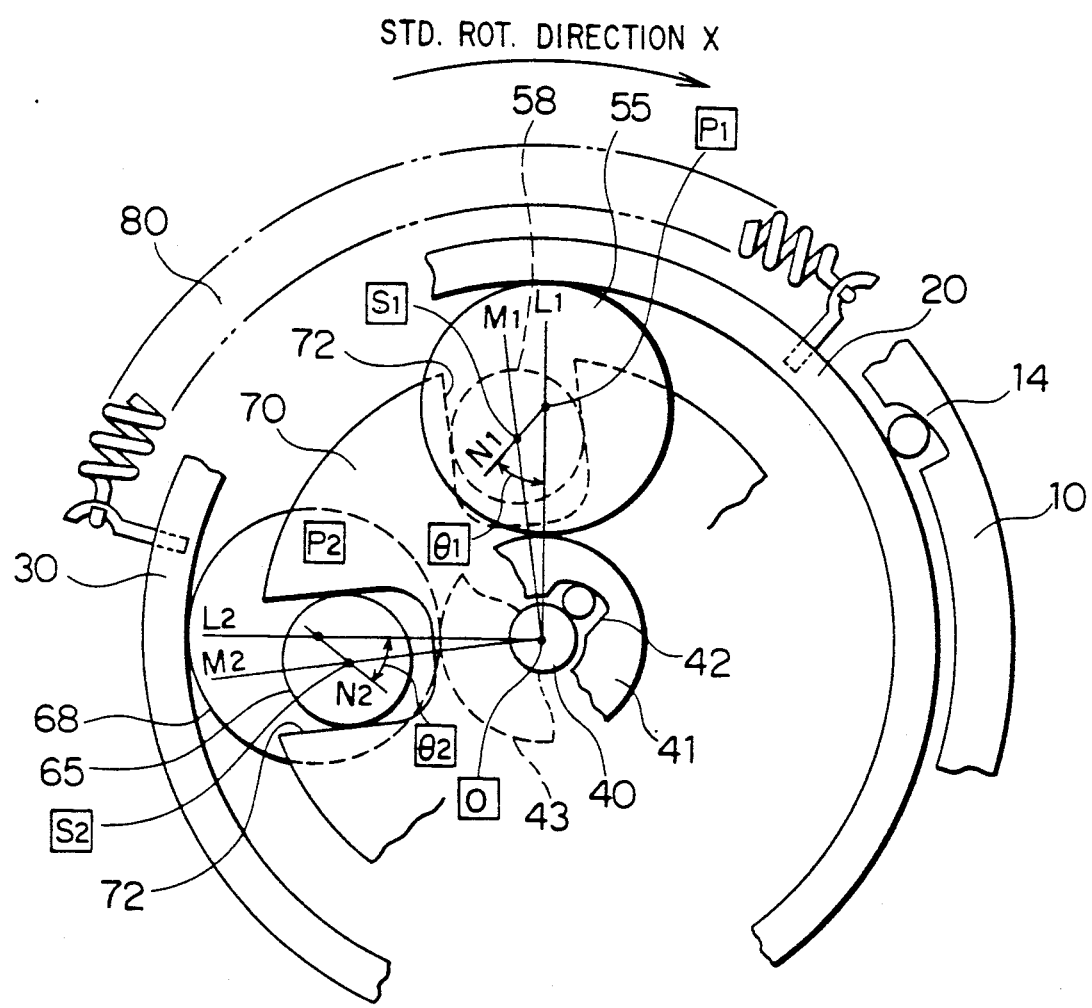

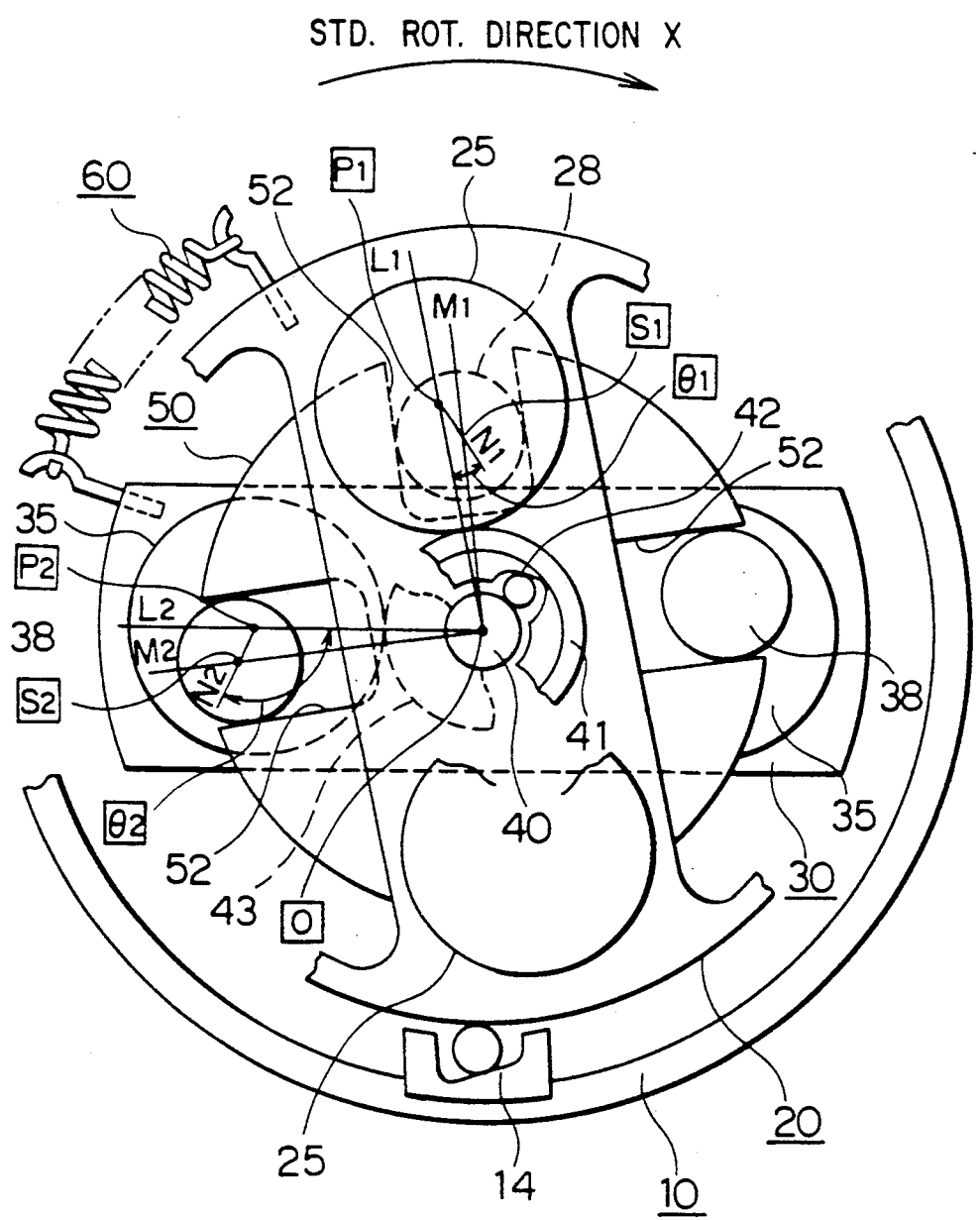

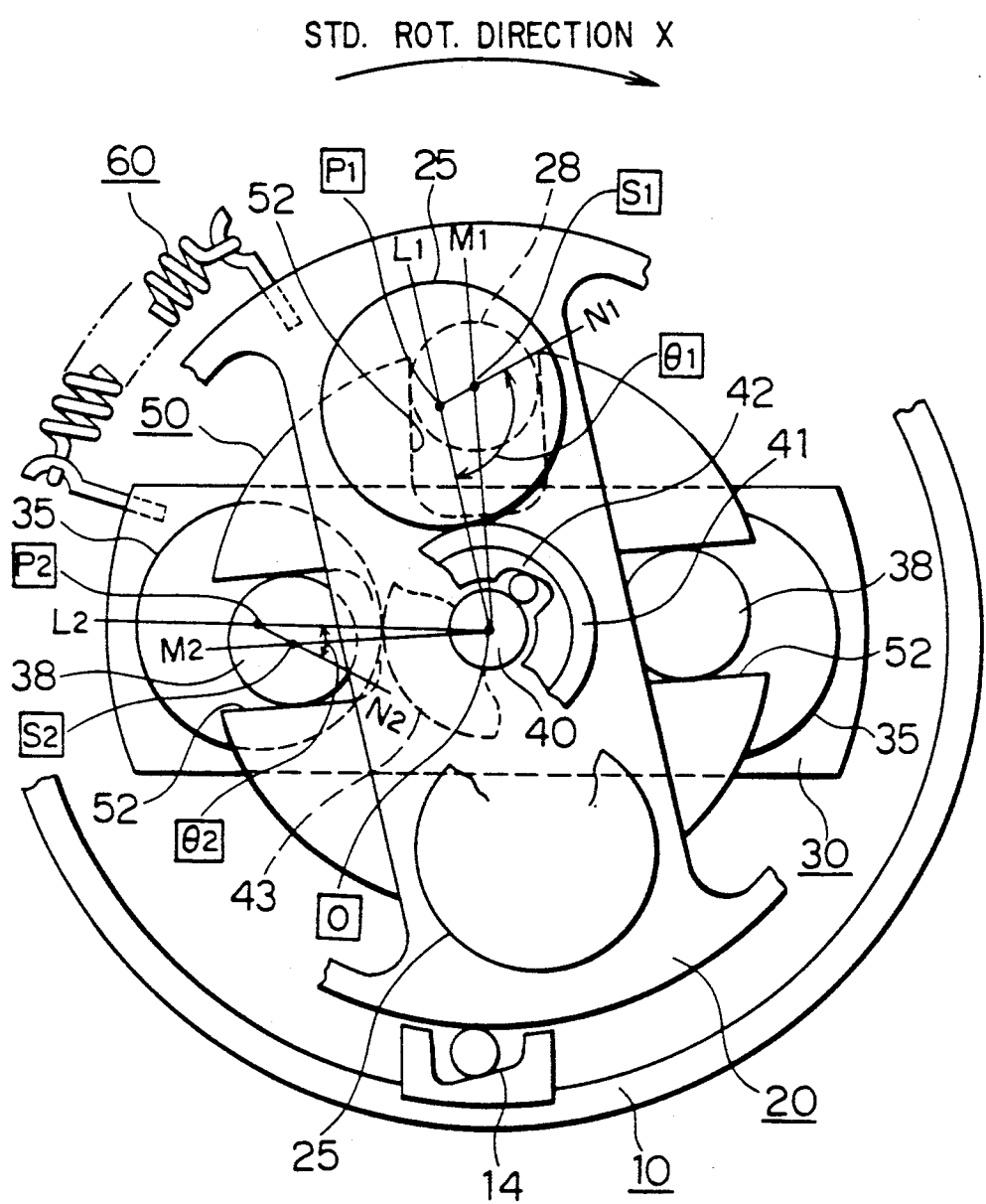

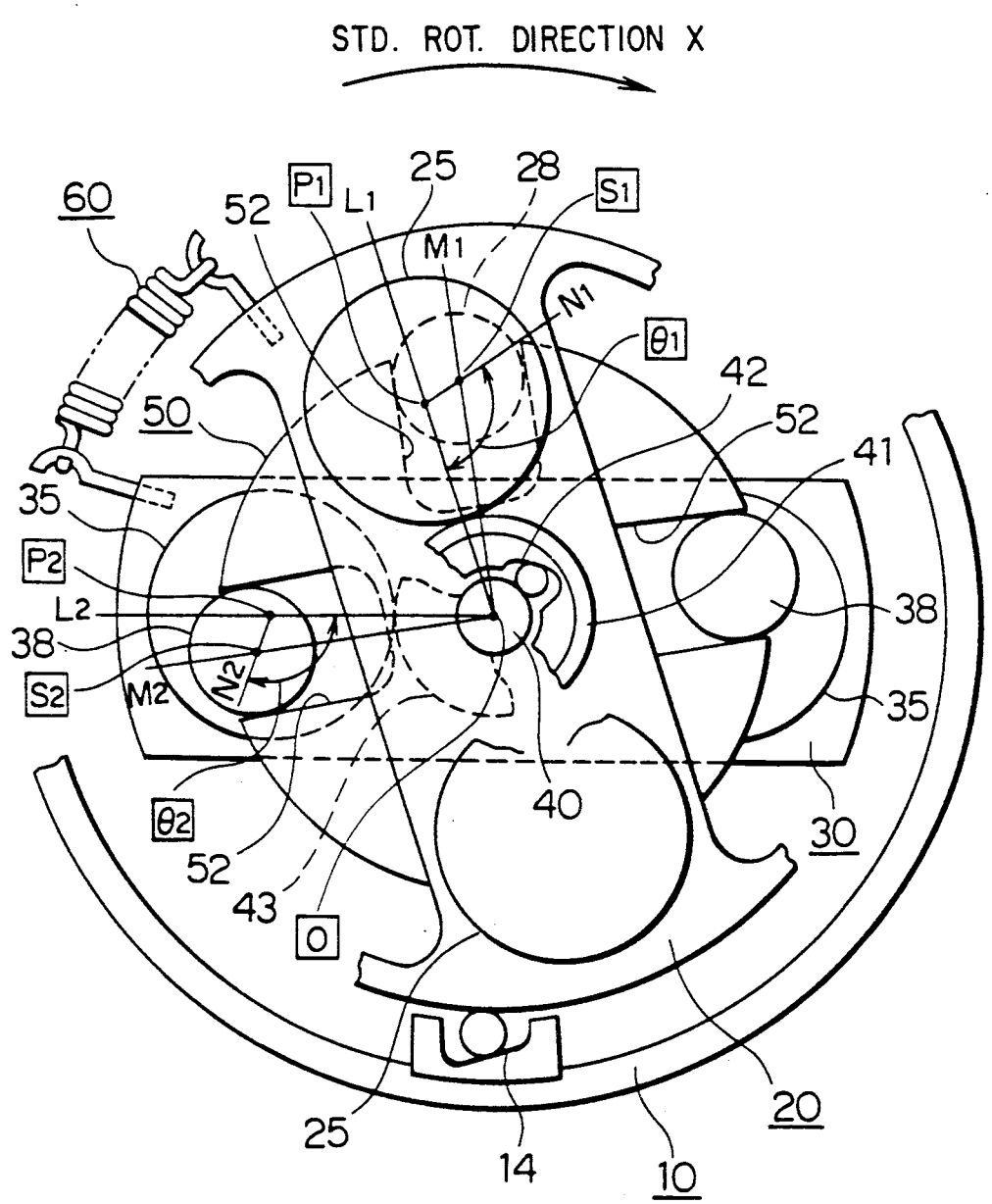

ROTATION TRANSMISSION DEVICE WITH A TORQUE LIMITING TRANSMISSION GEAR MECHANISM

BACKGROUND OF THE INVENTION

This invention relates to a rotation transmission device for transmitting a torque with a torque limiting function, and more particularly to such a device with a purely mechanical torque limiting transmission mechanism.

Conventionally, torque limiting transmission devices utilize, as the torque limiting transmission means, friction, viscosity or dynamic pressure of a fluid, or an electromagnetic force. While the magnitude of the load acting on the output shaft is below a predetermined maximum, a torque equal to the load is tranmitted from the input to the output shaft. However, when the load exceeds the predetermined maximum, the input shaft slips relative to the output, thereby limiting the torque of the output shaft under the predetermined maximum.

The conventional torque limiting transmission devices have the following characteristics: First, throughout during the torque limiting mode operation, the input shaft slips relative to the input shaft. Second, also throughout the torque limiting mode operation, the torque equal to the torque limiting value (the predetermined maximum) act on the input as well as the output shaft.

Thus, the conventional device has the following problems. Namely, within the torque limiting transmission is generated a power loss equal to the product of the predetermined maximum torque limiting value and the relative slipping rotational velocity between the input and the output shafts. Almost all the power loss is converted into thermal energy, and raises the temperature of the component parts in the neighborhood. Thus, measures should be taken to prevent the deformation or degeneration of the parts of the torque limiting transmission means. Further, there arises the problem of the function or performance that, due to the temperature rise, the maximum torque limiting value or the operational durability vary unstably.

SUMMARY OF THE INVENTION

It is therefore a primary object of this invention to provide an inexpensive and purely mechanically organized rotation transmission device with a torque limiting function wherein no power loss takes place when the load is above the predetermined maximum limit, thereby enhancing the reliability and durability.

The above object is accomplished according to the principle of this invention by a rotation transmission device for transmitting a torque in a predetermined rotational direction with a torque limiting function, which device comprises: a hollow cylindrical housing having two ends closed by a first and a second bracket, respectively; a first rotation member concentrically disposed within said housing and supported by said first bracket of the housing such that it is rotatable only in said predetermined rotational direction; an output shaft rotatably supported by said second bracket of the housing; a second rotation member concentrically disposed within said housing and connected integrally to said output shaft and rotatably supported by said second bracket of the housing, said first and second rotation members opposing each across an axial length within said housing; an annular torsional resilient member connecting the first and the second cup-shaped member across said axial length, said torsional resilient member exerting between the first and the second rotation members a torsional torque proportional to a relative rotational displacement of the first rotation member with respect to the second rotation member; an input shaft driven in said predetermined rotational direction and concentrically extending within said first and second rotation members to be rotatably supported by said first and second rotation members; and a torque transmission mechanism for transmitting torque from the input shaft to the first rotation member while the torsional torque exerted by said torsional resilient member from the first to the second rotation member in said predetermined rotational direction is below a predetermined magnitude, said torque transmission mechanism limiting under the predetermined magnitude the torque transmitted from the first to the second rotation member.

According to one aspect of this invention said torque tranmission mechanism comprises: a first internal gear formed integrally with said first rotation member to extend axially therefrom toward the second rotation member; a second internal gear formed integrally with said second rotation member to extend axially therefrom toward the first rotation member; a first sun gear supported concentrically on said input shaft in axial alignment with said first internal gear; a second sun gear supported concentrically on said input shaft in axial alignment with said second internal gear, wherein the first sun gear is supported on the input the shaft such that it is rotatable only in a direction opposite to said predetermined rotational direction while the second sun gear is fixed on the input shaft; a plurality of first planetary gears meshing with said first sun gear and first internal gear and rotatably supported at an equal eccentricity with respect to the input shaft on a first carrier rotatably supported on the input shaft, such that the first planetary gears are capable of planetary motion around the first sun gear; a plurality of second planetary gears meshing with said second sun gear and second internal gear and rotatably supported at an equal eccentricity with respect to the input shaft on a second carrier rotatably supported on the input shaft, such that the second planetary gears are capable of planetary motion around the second sun gear; first satellite shafts secured on and extending axially from respective first planetary gears with an eccentricity with respect to respective axes of rotation of the first planetary gears; second satellite shafts secured on and extending from respective second planetary gears with an eccentricity with respect to respective axes of rotation of the second planetary gears, the eccentricity of the second satellite shafts with respect to the respective axes of the second planetary gears being equal to the eccentricity of the first satellite shafts with respect to the respective axes of the first satellite gears; and a disk-shaped guide member rotatably supported on the input shaft between said first and second rotation members and having radially extending guide slots slidably engaging with said first and second satellite shafts, such that a torque in said predetermined direction is transmitted via the guide member while the torque is below said predetermined magnitude.

According to another aspect, the torque transmission mechanism comprises: a first sun gear concentrically supported on said input shaft; a second sun gear concentrically supported on said input shaft, wherein the first sun gear is supported on the input shaft such that it is rotatable only in a direction opposite to said predetermined rotational direction while the second sun gear is fixed on the input shaft; a plurality of first planetary gears meshing with said first sun gear and rotatably supported at an equal eccentricity with respect to the input shaft on a first carrier formed integrally with said first rotation member, such that the first planetary gears are capable of planetary motion around the first sun gear; a plurality of second planetary gears meshing with said second sun gear and rotatably supported at an equal eccentricity with respect to the input shaft on a second carrier formed integrally with said second rotation member, such that the second planetary gears are capable of planetary motion around the second sun gear; first satellite shafts secured on and extending axially from respective first planetary gears with an eccentricity planetary gears; second satellite shafts secured on and extending from respective second planetary gears with an eccentricity with respect to respective axes of rotation of the second planetary gears, to eccentricity of the second satellite shafts with respect to the respective axes of the second planetary gears being equal to the eccentricity of the first satellite shafts with respect to the respective axes of the second planetary gears; and a disk-shaped guide member rotatably supported on the input shaft between said first and second rotation members and having radially extending guide slots slidably engaging with said first and second satellite shafts, such that a torque in said predetermined direction is transmitted via the guide member while the torque is below said predetermined magnitude.

The novel features which are believed to be characteristic of this invention are set forth with particularity in the appended claims. This invention itself, however, both as to its organization and method of operation, together with further objects and advantages thereof, may best be understood from the detailed description of the preferred embodiments taken in connection with the accompanying drawings.

BRIEF DESCRIPTION OF THE DRAWINGS

FIGS. 5a, 5b, 6a and 6b are schematic operational views of the torque limiting transmission mechanism of the device of FIG. 1 as viewed from the direction of the arrow A, wherein FIGS. 5(a) and 5(b) show the mechanism in a first and a second asynchronous operation mode, respectively, and FIGS. 6(a) and 6(b) show the mechanism in the initial asynchronous and the final synchronous operation mode, respectively;

FIGS. 11a, 11b, 12a and 12b are schematic operational views of the torque limiting transmission mechanism of the device of FIG. 7 as viewed from the direction of the arrow A, wherein FIGS. 11(a) and 11(b) show the mechanism in a first and a second asynchronous operation mode, respectively, and FIGS. 12(a) and 12(b) show the mechanism in the initial asynchronous and the final synchronous operation mode, respectively;

DETAILED DESCRIPTION OF THE PREFERRED EMBODIMENTS

Figure 1:
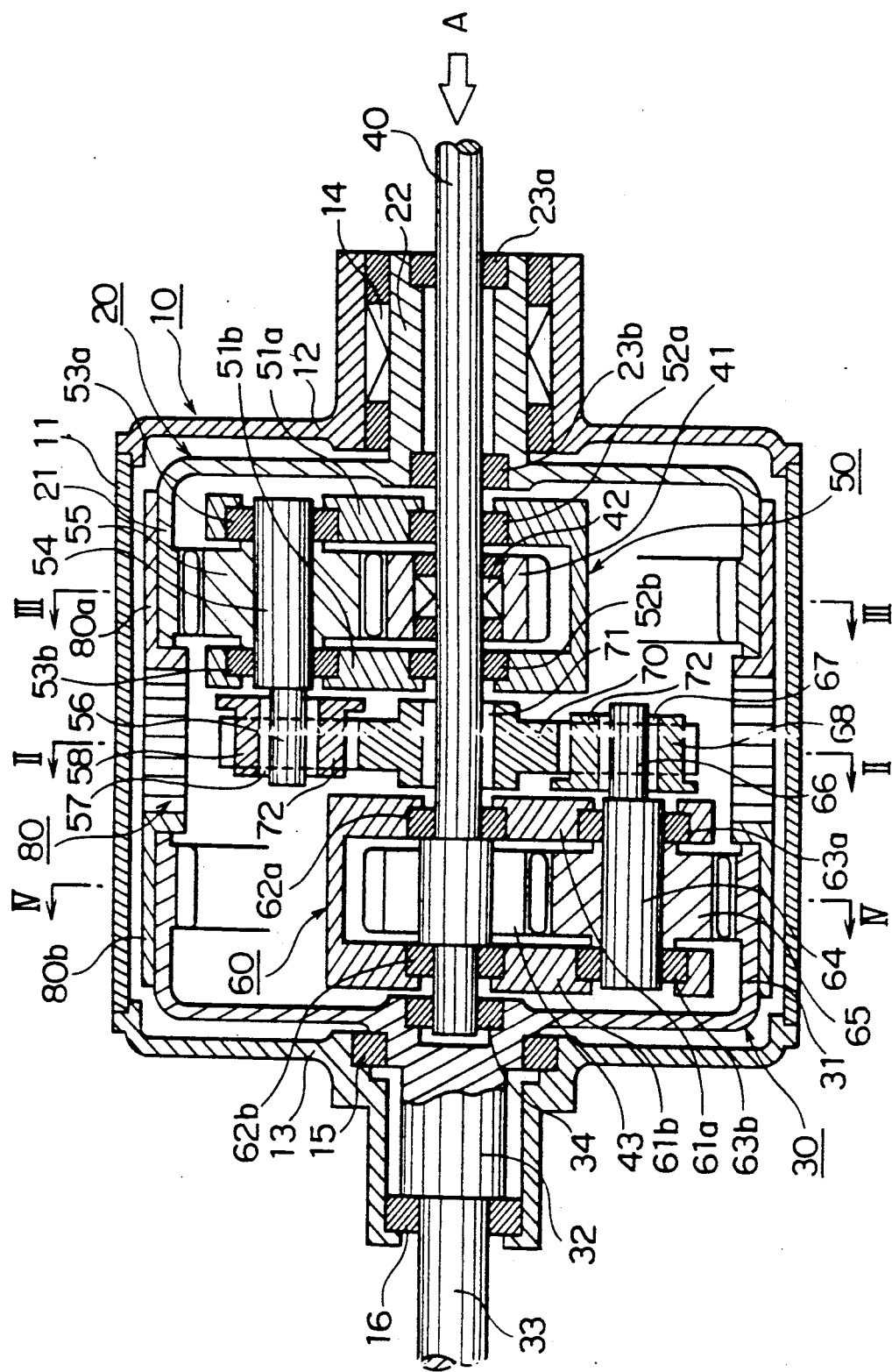
FIG. 1 is a sectional side view of a rotation transmission device according to a first embodiment of this invention.
Figure 2:
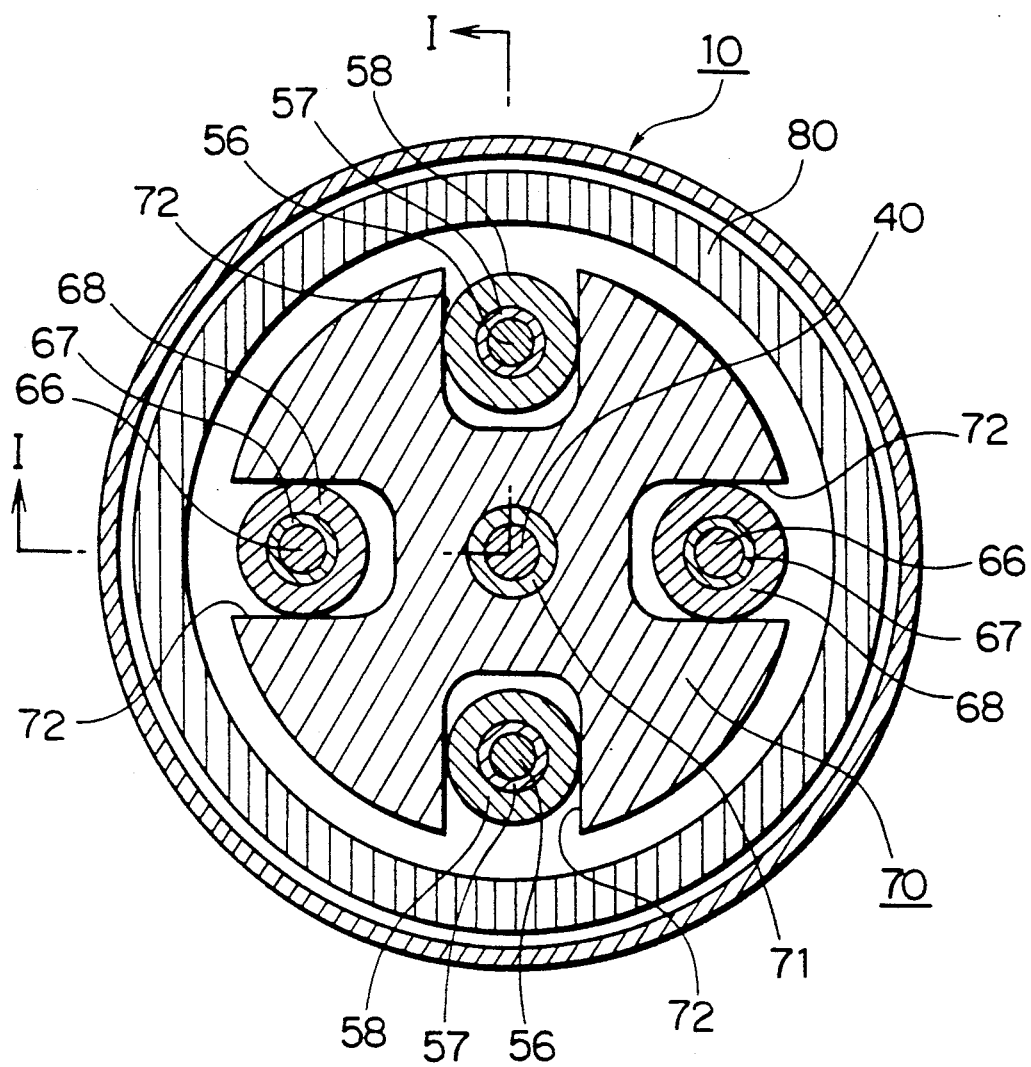
FIGS. 2 through 4 shows sections along the lines II—II, III—III, and IV—IV, respectively, of FIG. 1.

Referring first to FIGS. 1 through 4 of the drawings, the structure of the rotation transmission device according to the first embodiment of this invention is described.

The housing 10 of the transmission device comprises an outer hollow cylindrical casing 11 and a first and a second bracket 12 and 13 fixed thereto by means of through-bolts (not shown), etc., to close the two ends thereof. The torque acting on the input shaft 40 is transmitted to the output shaft 33 via a transmission mechanism with a torque limiting function according to this invention, as described in detail hereinbelow. In this embodiment, the input shaft 10 is driven in the clockwise direction as viewed from right (the input side) in FIG. 1. In what follows, the rotational directions are referred to as right or left as viewed from the input side (in the direction of the arrow A in FIG. 1).

A first cup-shaped rotation member 20, consisting of a disk-shaped base portion and an internal gear portion 21 integral therewith, is disposed concentrically within the housing 10 to open toward the output side (toward left in FIG. 1). The first rotation member is supported at a boss portion 22 on the first bracket 12 via a bearing 14 having a one-way clutch mechanism, such that the rotation member 20 is rotatable only in the clockwise direction. The internal gear portion 21 of the rotation member 20 is provided with integral teeth at the inner side surface thereof.

A second cup-shaped rotation member 30, formed integrally with the output shaft 33 to open toward the input side, is concentrically disposed within the housing 10 to oppose the first cup-shaped rotation member 20 across an axial length. The second rotation member 30 and the output shaft 33 are rotatably supported, at the boss portion 32 of the rotation member 30, on the second bracket 13 by means of a pair of bearings 15 and 16. The second rotation member 30 comprises an internal gear portion 31 provided with internal teeth formed on the inner side surface thereof.

A substantially annular torsional resilient member 80 bridges the cylindrical internal gear portions 21 and 31 of the first and second cup-shaped rotation members 20 and 30. Namely, the torsional resilient member 80 comprises a pair of flanges 80a and 80b and is secured to the internal gear portion 21 of the first rotation member 20 at the flange 80a, and to the internal gear portion 31 of the second rotation member 30 at the flange 80b thereof. Thus, the torsional resilient member 80 exerts between the first and the second rotation members 20 and 30 a torsional torque which is proportional to the relative rotational displacement of the first rotation member 20 with respect to the second rotation member 30.

The input shaft 40, extending through the boss portion 22 of the first cup-shaped rotation member 20, extends concentrically within the cup-shaped rotation members 20 and 30 to the boss portion 32 of the second rotation member 30. The input shaft is rotatably supported at the front end (at the left in FIG. 1) thereof on the boss portion 32 of the second rotation member 30 via a bearing 34 and at the root portion thereof on the boss portion 22 of the first rotation member 20 via a pair of bearings 23a and 23b.

The torque transmission mechanism for transmitting torque from the input shaft 40 to the first cup-shaped rotation member 20 is organized as follows.

A first sun gear 41 is supported on the input shaft 40 in axial alignment with the first internal gear 21 via a bearing 42 provided with the one-way clutch mechanism, such that the first sun gear 41 is rotatable only in the counterclockwise direction (the direction opposite to the predetermined rotational direction). On the other hand, a second sun gear 43 is fixed on the input shaft 40 in axial alignment with the second internal gear 31.

Figure 3:
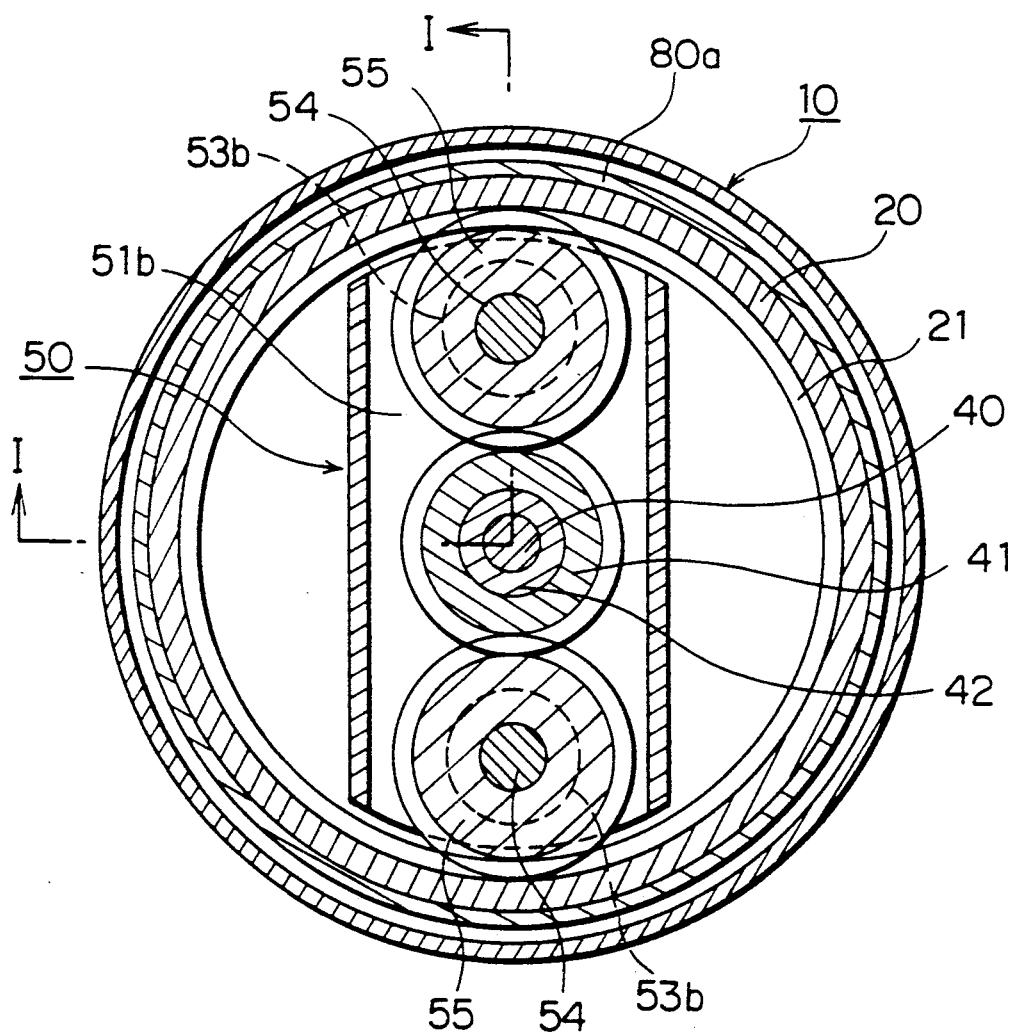

A pair of first planetary gears 55, fixed on the planetary shafts 54 rotatably carried by the first carrier 50, mesh with the first sun gear 41 and the first internal gear 21 on the first cup-shaped rotation member 20, such that the first planetary gears 55 are capable of planetary motion around the first sun gear 41. The carrier 50 comprises a pair of side plates 51a and 51b rotatably supported on the input shaft 40 via the bearings 52a and 52b provided on the central shaft holes thereof. The shafts 54 of the planetary gears 55 are rotatably supported by the side plates 51a and 51b of the carrier 50 via the bearings 53a and 53b, at an equal eccentricity with respect to the input shaft 40. The side plates 51a and 51b of the carrier 50 are connected via a pair of rectangular plates (the sections of which are shown in FIG. 3) to form a rectangular box structure opening in the radial direction.

Figure 4:
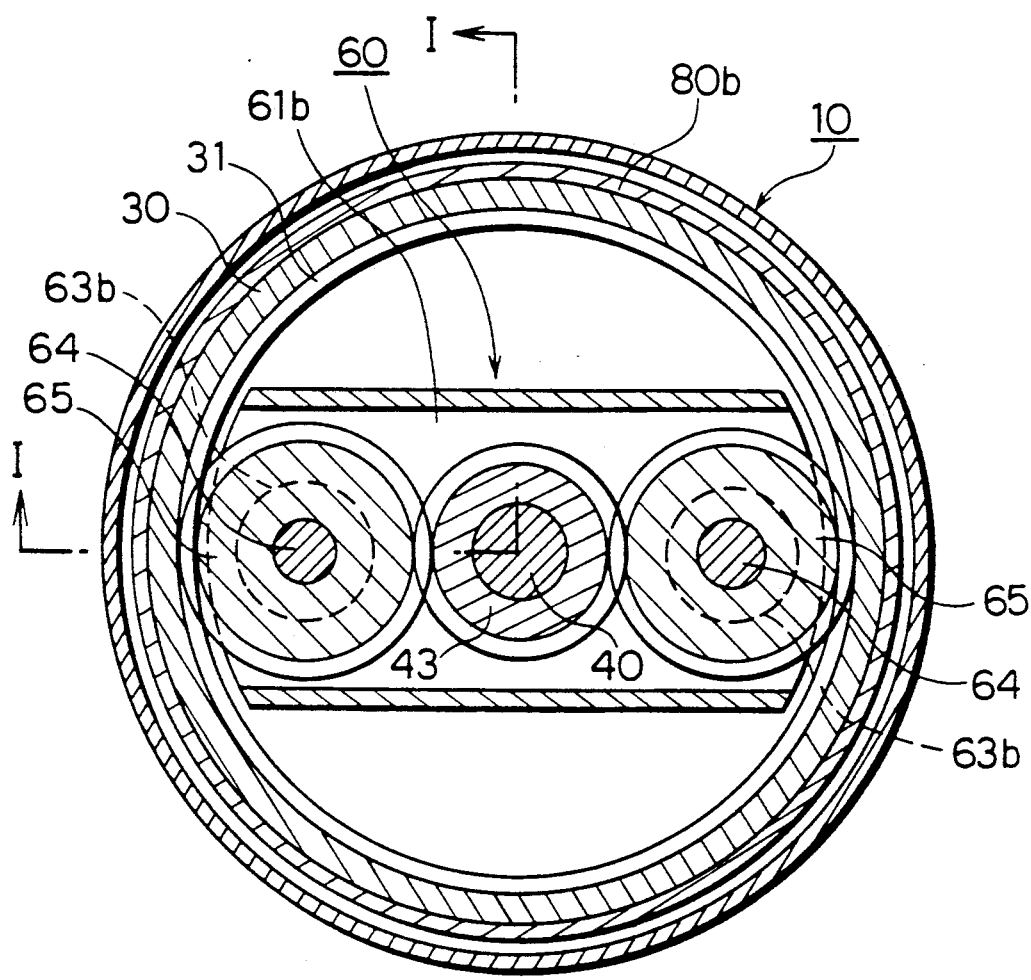

A pair of second planetary gears 65, fixed on the planetary shafts 64 and carried by the second carrier 60, mesh with the second sun gear 43 and the second internal gear 31 on the second cup-shaped rotation member 30, such that the second planetary gears 65 are capable of planetary motion around the second sun gear 43. The carrier 60 comprises a pair of side plates 61a and 61b rotatably supported on the input shaft 40 via the bearing 62a and 62b provided on the central shaft holes thereof. The shafts 64 of the planetary gears 65 are rotatably supported by the side plates 61a and 61b via the bearings 63a and 63b, at an equal eccentrically with respect to the input shaft 40. The side plates 61a and 61b of the carrier 60 are connected via a pair of rectangular plates (the sections of which are shown in FIG. 4) to form a rectangular box structure opening in the redial direction.

To the respective output side ends of the shafts 54 of the first planetary gears 55 are fixed first satellite shafts 56 to extend axially thereform with a predetermined eccentricity with respect to the respective central axes of the planetary gear shafts 54. Likewise, to the input side ends of the shafts 64 of the second planetary gears 55 are fixed second satellite shafts 66 with a predetermined eccentricity (equal to the above eccentricity of the first satellite shafts 56 with respect to the central axes of the first planetary gear shafts 54) with respect to the respective central axes of the planetary gear shafts 66. Further, first satellite rings 58 are rotatably and concentrically supported on satellite shafts 56 via bearings 57. Likewise, second satellite rings 68 are rotatably and concentrically supported on satellite shafts 66 via bearings 67. A guide disk 70, rotatably supported on the input shaft 40 via a bearing 71, has four equally spaced radially extending satellite guide slots 72 (see FIG. 2), antipodal two of which slidably engage with the first satellite rings 58 and the other antipodal two of which slidably engage with the second satellite rings 68.

The first and the second internal gears 21 and 31 have the same number of teeth. Likewise with respect to the first and the second sun gears 41 and 43. Thus, the first and the second planetary gears 55 and 65 have the same number of teeth.

Figure 5A:
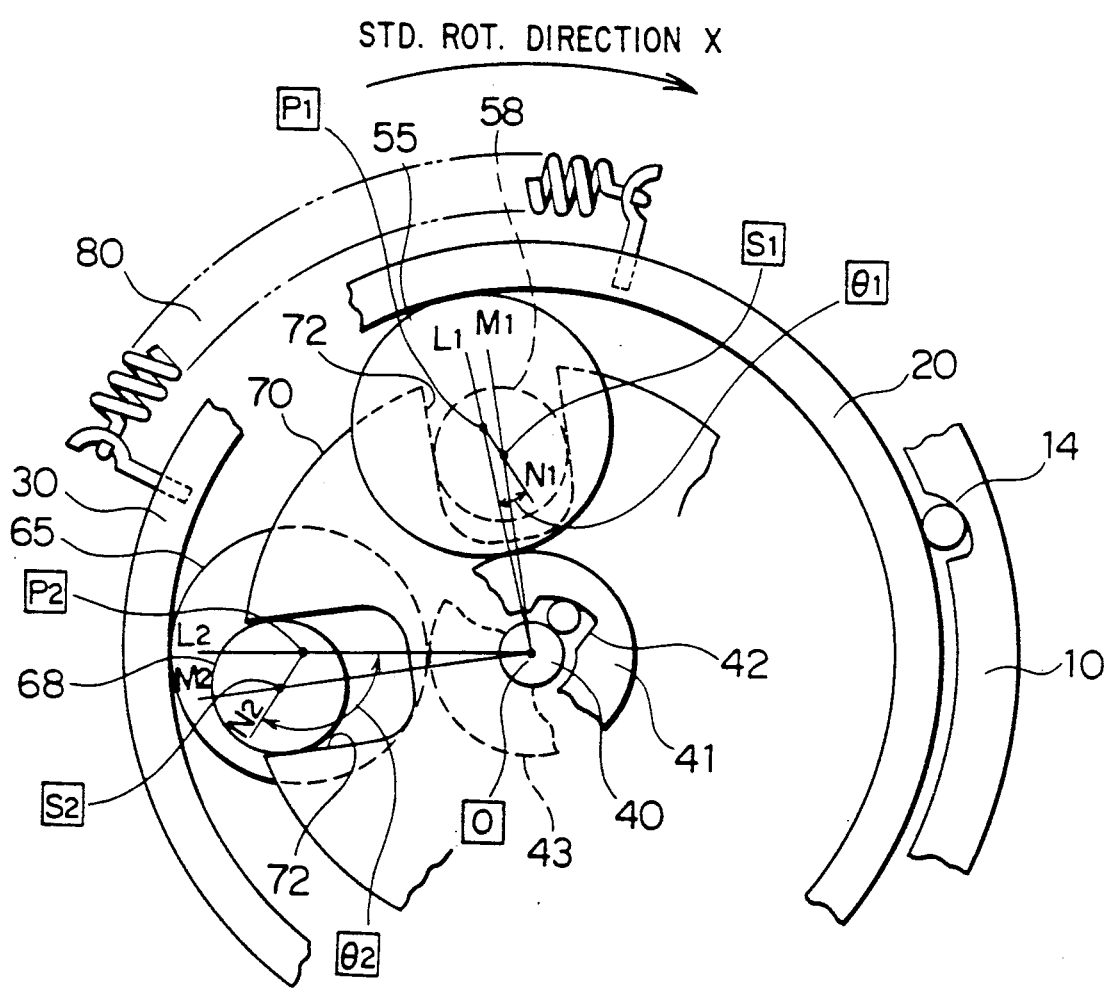
Figure 5B:
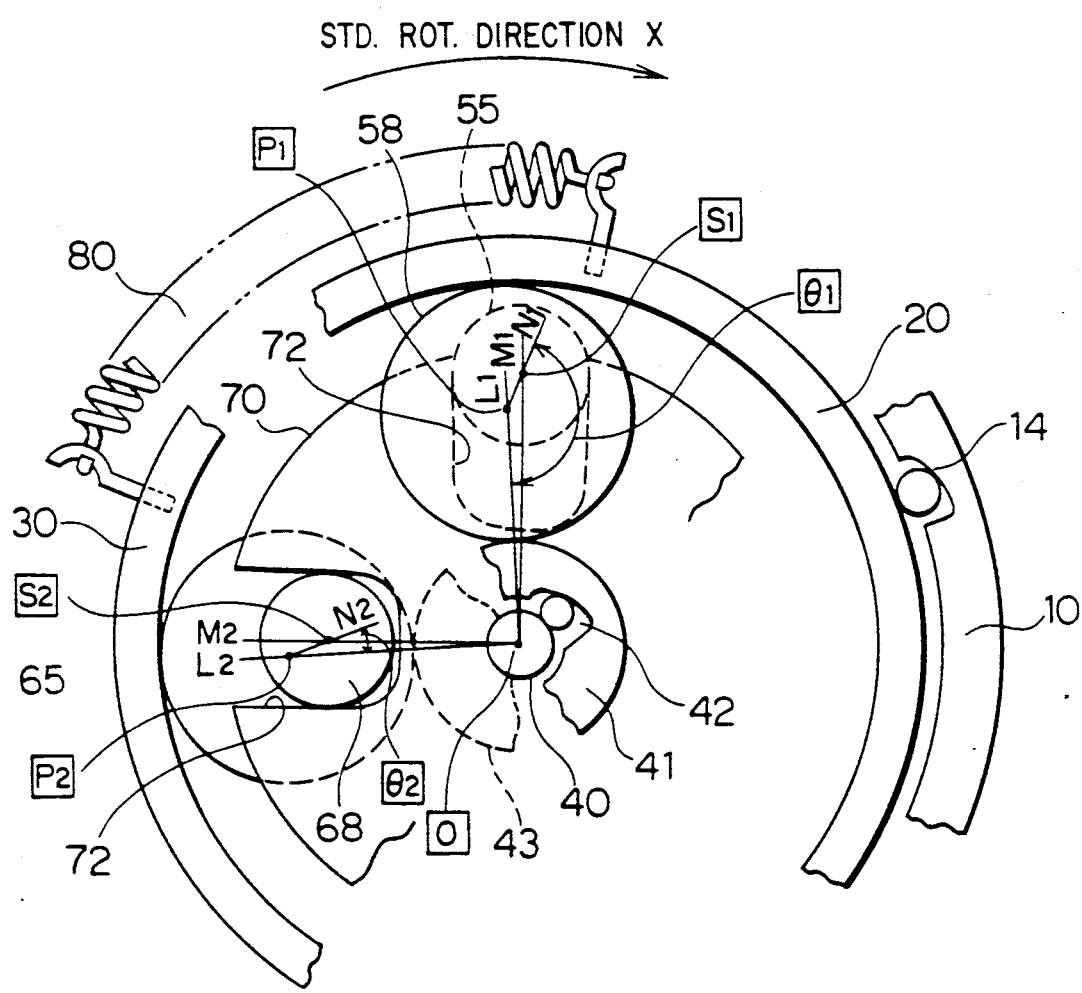
Figure 6A:
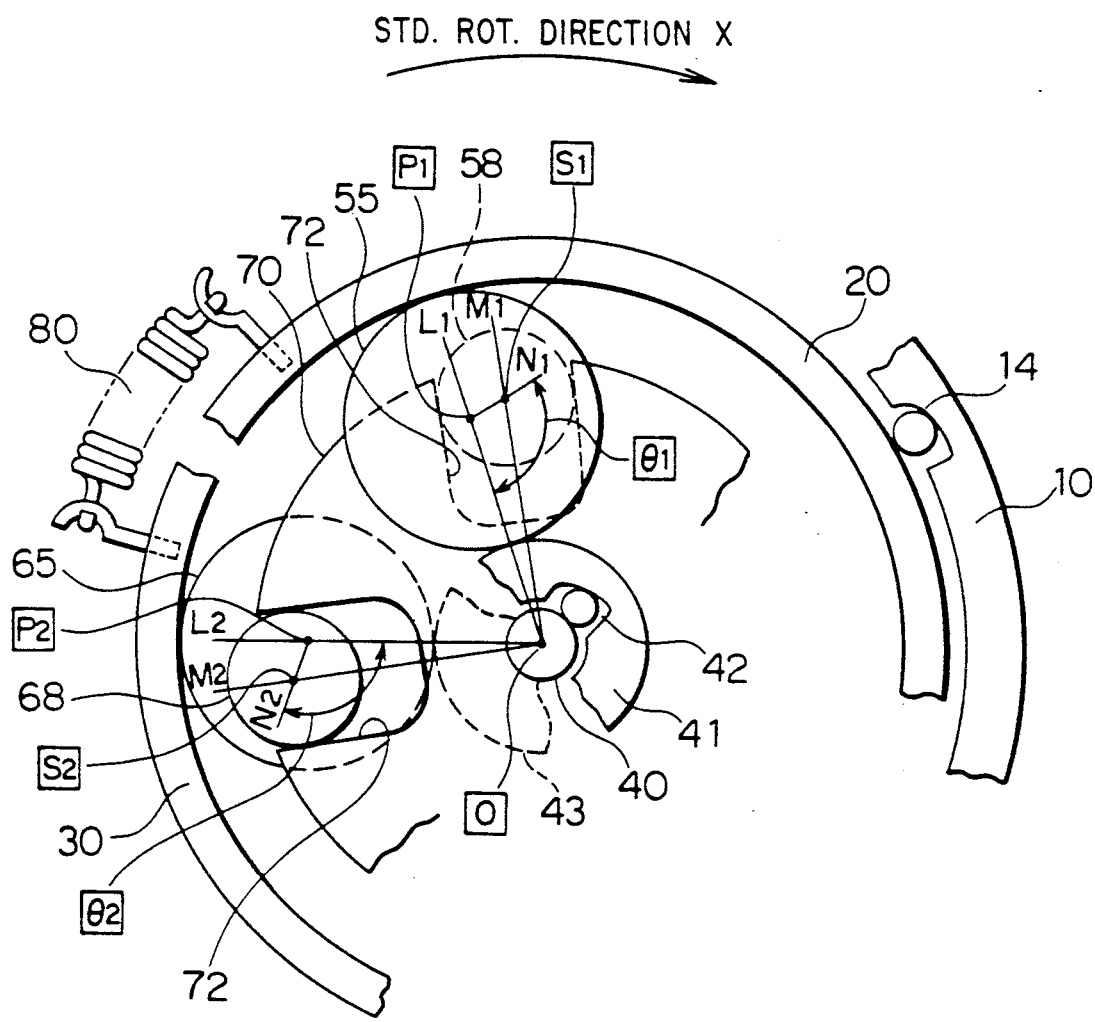

Next, the method of operation of the above torque transmission mechanism is described by reference to FIG. 5a, 5b, 6a and 6b which schematically show the mechanism as viewed from the input side (from the direction of the arrow A in FIG. 1). FIGS. 5(a) and 5(b) show the mechanism in two distinct operational states (in two distinct asynchronous modes as described below); FIG. 6(a) shows the mechanism in the non-operating initial state and FIG. 6(b) shows the mechanism in the state where the torque limiting function of the mechanism is in operation. In FIGS. 5 and 6, each gear is represented by its pitch circle and the center. Since the first and the second sun gears 41 and 43 completely overlap with each other, they are shown in partial representations; likewise with the internal gears of the first and the second cup-shaped rotation members 20 and 30. The guide disk 70 is also shown partially, wherein the two guide slots represented in the figures engage with the firstt and the second satellite ring 58 and 68, respectively. The bearings 14 and 42 having the one-way clutch function are represented schematically so as to show their functions clearly. Thus, the bearing 14 supports the first rotation member 20 on the housing 10 in such a manner that the rotation member 20 is rotatable only in the clockwise direction (standard direction X) relative to the stationary housing 10; on the other hand, the bearing 42 supports the first sun gear 41 on the input shaft 40 in such a manner that the sun gear 41 is rotatable only in the counterclockwise direction (the direction opposite to the standard direction X) relative to the input shaft 40. Further, the annular torsional member 80 is schematically shown in the form of a helical tension spring to represent the function thereof schematically, and clearly.

Before embarking on the description of the operation, the meanings of the reference characters, etc., in FIGS. 5 and 6 are first summarized:

direction X is the standard rotational direction (clockwise as viewed from the input side);

point O is the center of the input shaft 40;

points P1 and P2 are the centers of the first and the second planetary shafts 54 and 64, respectively;

points S1 and S2 are the centers of the first and the second satellite shafts 56 and 66, respectively;

line L1 is the radius which connects the center O and the point P1;

line M1 is the radius which connects the center O to the point S1 and which is the central redial line of the guide slot 72 engaging with the first satellite ring 58;

line N1 is the line which connects the points P1 and S1, i.e., the revoluntionary radius of the first satellite ring 58 around the center P1;

angle $\theta 1$ represents the angle $\angle OP1S1$ formed by the lines L1 and N1, i.e., the rotational angle of the first planetary gear 55 (or the revolutional angle of the first satellite ring 58) with respect to the raduis L1 connecting the sun center O to the planetray center P1, wherein the angle $\theta 1$ is measured positive in the direction of rotation of the first planetary gears 55 around the center P1 (i.e., in the counterclockwise direction), such that $\theta 1$ falls between $-180°$ and $+180°$.

line L2 is the radius which connects the center O to the point P2;

line M2 is the radius which connects the center O to the point S2 and which is the central radial line of the guide slot 72 engaging with the second satellite ring 68;

line N2 is the line which connects the points P2 and S2, i.e., the revolutionary radius of the second satellite rings 68 around the center P2;

angle $\theta 2$ represents the angle $\angle OP2S2$ formed by the lines L2 and N2, i.e., the rotational angle of the second planetary gear 65 (or the revolutional angle of the second satellite ring 68) with respect to the radius L2 connecting the sun center O to the planetary center P2, wherein angle $\theta 2$ is measured positive in the direction of rotation of the second planetary gears 65 around the center P2 (counterclockwise), such that $\theta 2$ falls between $-180°$ and $+180°$.

In the following description of the method of operation of the transmission mechanism according to the above embodiment, the mechanism is said to be in a synchronous state when the above-defined angles $\theta 1$ and $\theta 2$ are equal in magnitude and sign ($\theta 1 = \theta 2$); the mechanism is said to be in an asynchronous state, when the angles $\theta 1$ and $\theta 2$ are different from each other ($\theta 1 \neq \theta 2$). It is characteristic of the transmission mechanism according to this invention that the modes of operation are different according to whether the mechanism is in a synchronous or an asynchronous state, and, when it is in an asynchronous state, according to whether cos $\theta 1$ is greater than cos $\theta 2$ (cos $\theta 1 >$ cos $\theta 2$), referred to as the first asynchronous mode, or cos $\theta 1$ is smaller than cos $\theta 2$ (cos $\theta <$ cos $\theta 2$), referred to as the second asynchronous mode.

Referring first to FIG. 5($a$), the first asynchronous mode operation of the transmission mechanism is described, where cos $\theta 1$ is greater than cos $\theta 2$. In the state shown in FIG. 5($a$), let us make the fundamental assumption that:

(1) the output shaft 33 and hence the second rotation member 30 remains stationary. Further let us make (at least for the present) a further assumption (2) that (2a) the first rotation member 20 also remains stationary, and that (2b) the first sun gear 41 rotates at the same speed with the second sun gear 43 (i.e., the first sun gear 41 is stationary relative to the input shaft 40).

Under these assumption (1) and (2), the first and the second planetary gears 55 and 65 rotates counterclockwise around the respective centers P1 and P2 thereof and revolves clockwise around the center O of the input shaft 40, the rotational and revolutional velocities of the first and second planetary gears 55 and 65 being equal to each other, respectively. Thus, the revolutional velocities $\omega 1$ of the centers P1 and P2 of the first and the second planetary gears 55 and 65 around the center O are equal to each other. However, the revolutional velocities of the centers S1 and S2 of the satellite rings 58 and 68 around the sun center O are not equal to each other. Namely, since the planetary gears 55 and 65 rotate around the respective centers P1 and P2 thereof and hence the centers S1 and S2 of the satellite rings themselves revolve around the respective centers P1 and P2, the clockwise revolutional velocity of the satellite center S1 or S2 around the sun center O is obtained by adding to the revolutional velocity $\omega 1$ of the planetary center P1 or P2 around the sun center O the revolutional velocity component $\omega 2$ of the satellite center S1 or S2 with respect to the sun center O, which component results from the revolution of the satellite center S1 or S2 around the planetary center P1 or P2. Namely, the total angular revolutional velocity $\omega$ of the satellite center S1 or S2 around the sun center O is given by: $\omega = \omega 1 + \omega 2$, where the revolutional velocity component $\omega 2$ is proportional to cos $\theta 1$ or cos $\theta 2$ and inversely proportional to the length of the radius OS1 or OS2. Since the lengths of the radii OS1 and OS2 are substantially constant and equal to each other, the velocity components $\omega 2$ of points S1 and S2 can be regarded to be substantially proportional to the magnitudes of cos $\theta 1$ and cos $\theta 2$, respectively. Thus, the revolutional velocity components $\omega 2$ of the points S1 and S2 vary periodically with the passage of time.

If the mechanism is in the first asynchronous state where cos $\theta 1$ is greater than cos $\theta 2$ (cos $\theta 1 >$ cos $\theta 2$) as shown in FIG. 5($a$), and if the above assumptions (1) and (2) are both maintained, the total revolutional angular velocity of the point S1 around the center O becomes greater than that of the point S2 around the center O. This consequence, however, is impossible. Namely, the points S1 and S2 lie on the central radial lines M1 and M2, respectively, of the guide slots 72 of the guide disk 70, and hence the angle $\angle S1OS2$ should remain constant (equal to a right angle in the case of the embodiment). Thus, if the assumption (1) is maintained, either (2a) or (2b) of the second assumption (2) should be discarded. In the case shown in FIG. 5($a$), the revolutional velocity of the point S1 should be further reduced to be made equal to that of the point S2. This can be effected either by reducing the rotational velocity of the first sun gear 41 or by rotating the first rotation member 20 in the counterclockwise direction. The latter however is impossible due to the function of the one-way clutch of the bearing 14. The former, on the other hand, is possible in view of the free-rotational direction of the one-way clutch of the bearing 42. Thus, the assumption (2b) should be discarded.

Thus the method of operation of the mechanism in the first asynchronous mode may be summarized as follows: When the input shaft 40 is driven, the second planetary gears 65 are driven via the second sun gear 43 fixed on the input shaft 40. The movements of the second planetary gears 65 entail the movements of the second satellite rings 68. The guide disk 70 engaging with the satellite rings 68 is thus rotated in the clockwise direction in accordance with the revolutional and rotational velocity of the second planetary gears 65. Due to the constraint acting on the first planetary gears 55 from the guide disk 70 via the first satellite rings 58, the first sun gear slips in the counterclockwise direction relative to the input shaft 40 while the first rotation member 20 remains stationary due to the action of the one-way clutch bearing 14. Thus, during the first asynchronous mode, the torsion of the torsional resilient member 80 remains constant while the difference between the angles $\theta 1$ and $\theta 2$ is reduced.

FIG. 5($b$) represents the transmission mechanism in the second asynchronous mode where cos $\theta 1$ is less than cos $\theta 2$ (cos $\theta 1 <$ cos $\theta 2$). If we make the same above-mentioned assumptions (1) and (2), an argument similar to the above leads to an impossible conclusion that the revolutional velocity of the first satellite centers S1 around the sun center O in the clockwise direction is smaller than that of the second satellite centers S2. As described above, the angle formed by the lines OS1 and OS2 is fixed—equal to a right angle—since the lines OS1 and OS2 are the central radial lines of the guide slots 72 of the guide disk 70. In order to increase the revolutional velocity of the first satellite centers S1 around the sun center O, either the rotational velocity of the first sun gear 41 should be increased, or the first rotation member 20 should be rotated in the clockwise standard direction X. In view of the one-way clutch function of the bearings 14 and 42, only the latter alternative is possible. Namely, if the first assumption (1) is maintained, we are forced to discard the first (2a) of the second assumption (2).

Thus the method of operation of the mechanism in the second asynchronous mode where $\cos\theta_1 < \cos\theta_2$ may be summarized as follows: When the input shaft 40 is driven, the second planetary gears 65 are driven via the second sun gear 43 fixed on the input shaft 40. The movements of the second planetary gears 65 entail the movements of the second satellite rings 68. The guide disk 70 engaging with the satellite rings 68 is thus rotated in the clockwise direction in accordance with the revolutional and rotational velocity of the second planetary gears 65. Due to the constraint acting on the first planetary gears 55 from the guide disk 70 via the first satellite rings 58, the first rotation member 20 rotates in the clockwise direction relative to the second rotation member 30 while the first sun gear 40 is stationary relative to the input shaft 40 and rotates together therewith, due to the one-way clutch function of the bearing 42. Thus, during the second asynchronous mode, the angular displacement of the first rotation 20 member with respect to the second rotation member 30 increases, thereby increasing the torsional torque of the torsional resilient member 80 acting between the first and second rotation members 20 and 30; further, the difference between the angles $\theta_1$ and $\theta_2$ is reduced.

Thus, both in the first and the second asynchronous modes, the first planetary gears 55 rotate in the clockwise direction relative to the second planetary gears 65, thereby reducing the difference between the angles $\theta_1$ and $\theta_2$. Consequently, if the mechanism is in the asynchronous state (i.e., $\theta_1 \neq \theta_2$), the operation of the mechanism continuously reduces the difference between the angles $\theta_1$ and $\theta_2$, the mechanism thereby tending toward the synchronous state ($\theta_1 = \theta_2$).

FIG. 6(a) shows the mechanism in the initial non-operating state. Namely, the angular displacement of the first rotation member 20 relative to the second rotation member 30 is null, and hence the resilient member 80 exerts null torsional torque between the first and the second rotation members 20 and 30. On the other hand, the angle $\theta_1$ is greater than the $\theta_2$ ($\theta_1 > \theta_2$), and the mechanism is in an asynchronous state. Thus, when the input shaft 40 is driven in the clockwise standard direction X, the mechanism is operated alternately in the first and the second asynchronous modes, as described above by reference to FIGS. 5(a) and 5(b). Namely, if the mechanism is initially in the first asynchronous mode, then it passes into the second asynchronous mode, and alternates between the first and the second asynchronous mode operations thereafter. During the first asynchronous mode periods, the rotational displacement of the first rotation member 20 relative to the second rotation member 30, and hence the torsional torque exerted by the torsional resilient member 80 therebetween, remains constant. On the other hand, during the second asynchronous mode periods, the first rotation member 20 is rotated in the clockwise direction relative to the second rotation member 30 such that the torsional torque exerted by the torsional resilient member 80 increases. Consequently, the torsional torque of the resilient member 80 is accumulated.

The output shaft 33 integral with the second rotation member 30 is thus acted on by an increasing output torque equal to the torsional torque exerted by the resilient member 80 from the first rotation member 20 to the second rotation member 30. The reaction of the output torque acts partially on the input shaft 40. However, it is grounded in the main part thereof on the housing 10 via the one-way clutch mechanism of the bearing 14. When the increasing output torque thus increases to become equal to (or greater than) the torque acting on the output shaft 33 from an exterior load (not shown), the output shaft 33 begins to rotate together with the load. Otherwise, the output torque increases until the mechanism finally reaches the synchronous state where the output torque takes its predetermined maximum.

FIG. 6(b) shows the mechanism in the final synchronous state in which the output torque is at the predetermined maximum and the torque limiting function according to this invention is in operation. In the final synchronous state, the rotational displacement of the first rotation member 20 relative to the second rotational member 30 is at the maximum, such that the resilient member 80 exerts a predetermined maximum torsional torque from the first rotation member 20 to the second rotation member 30. The reaction of the output torque in this state acts on and is grounded by the housing 10 in its totality via the one-way clutch function of the bearing 14, rather than acting on the input shaft 40. Since the mechanism is in the synchronous state ($\theta_1 = \theta_2$), the above assumptions (1) and (2) ((2a) and (2b)) can be satisfied simultaneously. Thus, the relative position of the first and the second rotation members 20 and 30 remains the same, while all the other gears of the mechanism continue to rotate without transmitting torque therebetween. Once the mechanism reaches the synchronous torque limiting state, it is retained in such state unless the load torque acting on the output shaft 33 becomes less than the predetermined maximum torque.

As described above, although the predetermined maximum torque acts on the output shaft 33 in the final synchronous torque limiting operation mode, the reaction on the input shaft 40 is null in principle. Thus, so long as the output shaft 33 remains stationary, the motive power or energy is not dissipated, in principle, regardless of how fast or how long the input shaft is rotated.

Referring next to FIGS. 7 to 10 of the drawings, the structure of the rotation transmission device according to a second embodiment of this invention is described.

The housing 10 of the transmission device comprises an outer hollow cylindrical casing 11 and a first and a second bracket 12 and 13 fixed thereto by means of through-bolts (not shown), etc., to close the two ends thereof. The torque acting on the input shaft 40 is transmitted to the output shaft 33 via a transmission mechanism with a torque limiting function according to the second embodiment of this invention, as described in detail hereinbelow. As in the case of the first embodiment, the input shaft 40 is driven in the clockwise direction as viewed from right (the input side) in FIG. 7. In what follows, the rotational directions are referred to as right or left as viewed from the input side (from the direction of the arrow A in FIG. 7).

A first disk-shaped rotation member 21, forming part of a first radially open box-shaped carrier 20, is disposed concentrically within the housing 10. The first rotation member 21 is supported at a boss portion 23 thereof on the first bracket 12 via a bearing 14 having a one-way clutch mechanism, such that the first rotation member 21 is rotatable only in the clockwise direction.

A second disk-shaped rotation member 31, forming part of a second radially open box-shaped carrier 30 and formed integrally with the output shaft 33, is concentrically disposed within the housing 10 to oppose the first disk-shaped rotation member 21 across an axial length within the housing 10. The second rotation member 31 is rotatably supported, together with the output shaft 33 integral therewith, on the second bracket 13 by means of a pair of bearings 15 and 16.

A substantially annular torsional resilient member 60 bridges the circumferences of the first and second rotation members 21 and 31 across the axial length. Namely, the torsional resilient member 60 comprises a pair of flanges 60a and 60b and is secured to the first rotation member 21 at the flange 60a, and to the second rotation member 31 at the flange 60b thereof. Thus, the torsional resilient member 60 exerts between the first and the second rotation members 21 and 31 a torsional torque which is proportional to the relative rotational (i.e., angular) displacement of the first rotation member 21 with respect to the second rotation member 31.

The input shaft 40, extending through the boss portion 23 of the first rotation member 21, extends concentrically within the housing 10 through the first and the second carrier 20 and 30, and is rotatably supported at the front side (at the left in FIG. 7) thereof on the second carrier 30 via a pair of bearings 33a and 32b, and at the root portion thereof on the first carrier 20 via a pair of bearings 22b and 23.

The torque transmission mechanism for transmitting torque from the input shaft 40 to the first rotation member 21 is organized as follows.

Figure 7:
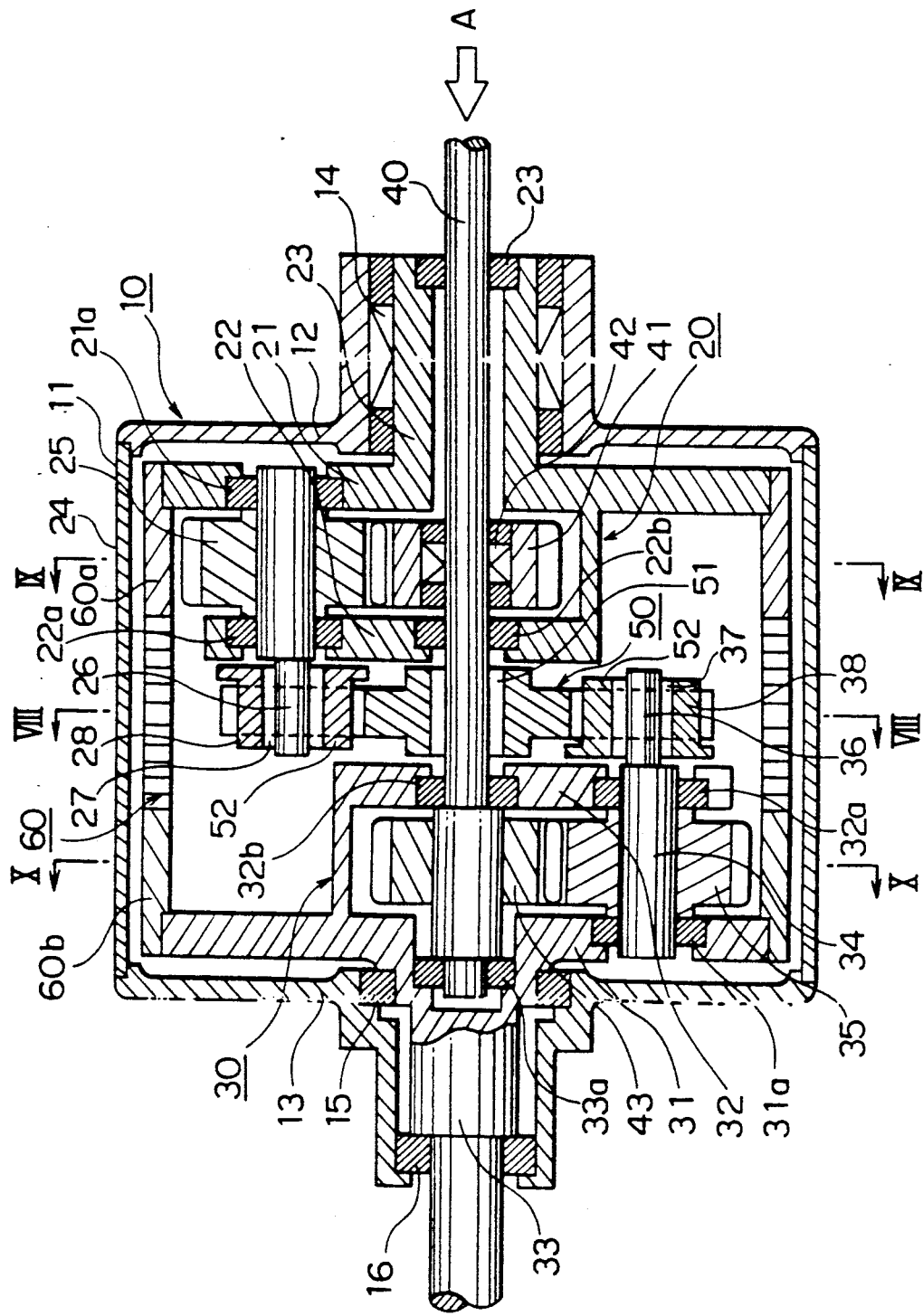
FIG. 7 is a sectional side view of a rotation transmission device according to a second embodiment of this invention taken along line VII—VII of FIG. 10.
Figure 8:
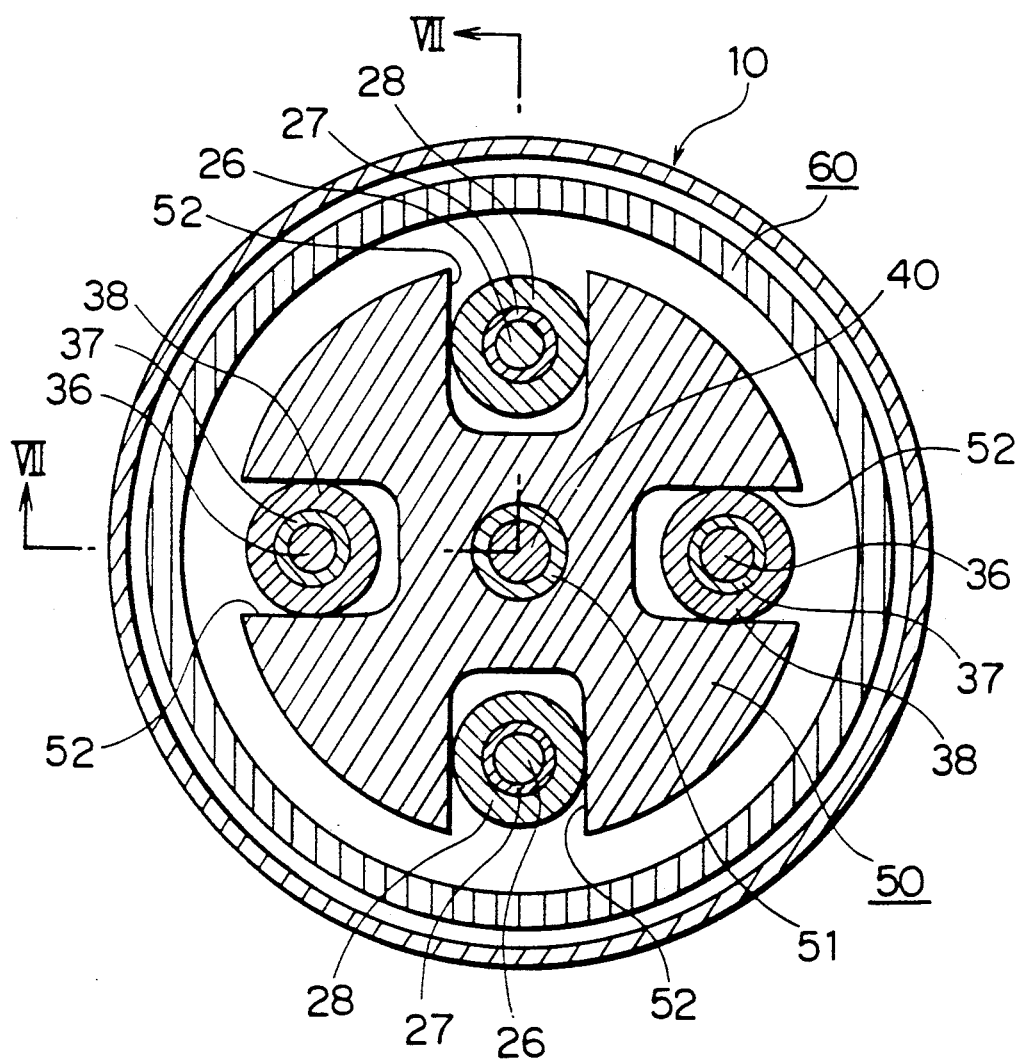
FIGS. 8 through 10 show sections along the lines VIII—VIII, IX—IX, and X—X, respectively, of FIG. 7.
Figure 9:
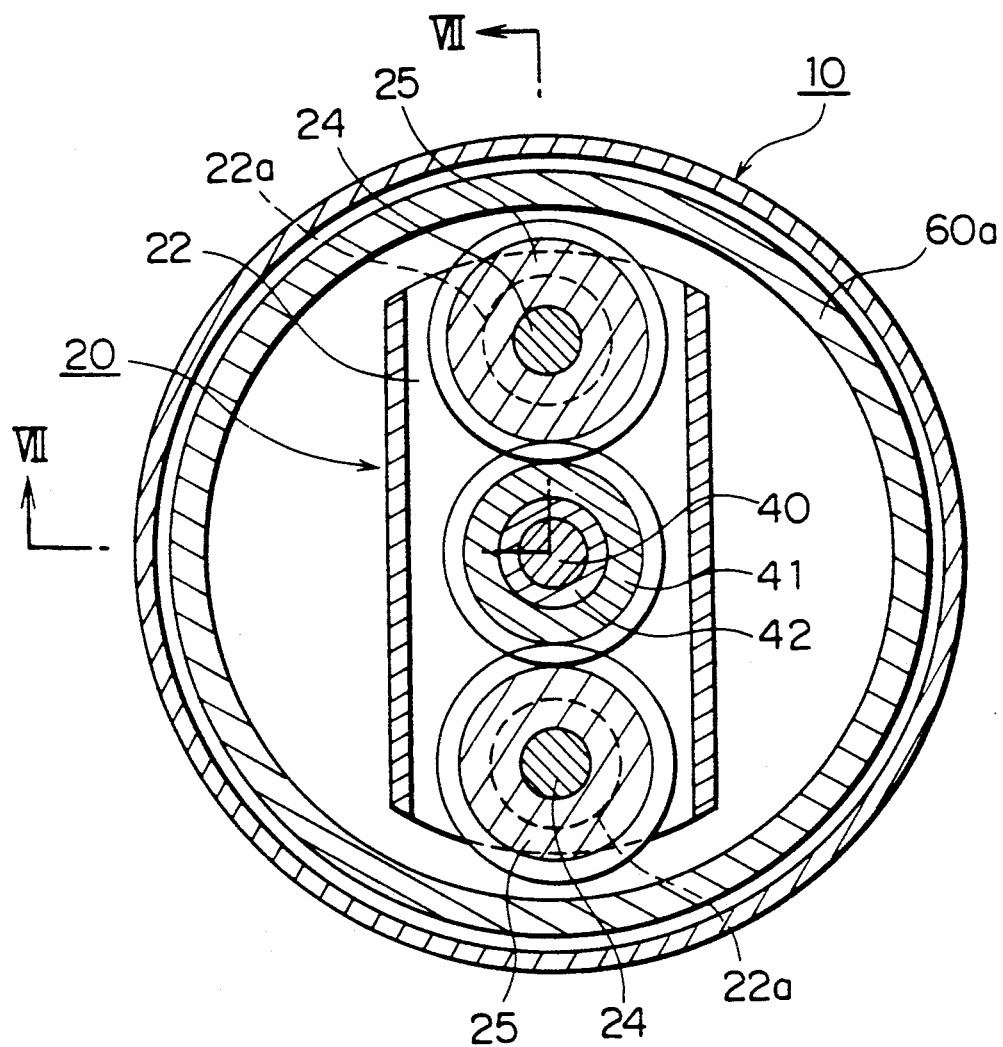
Figure 10:
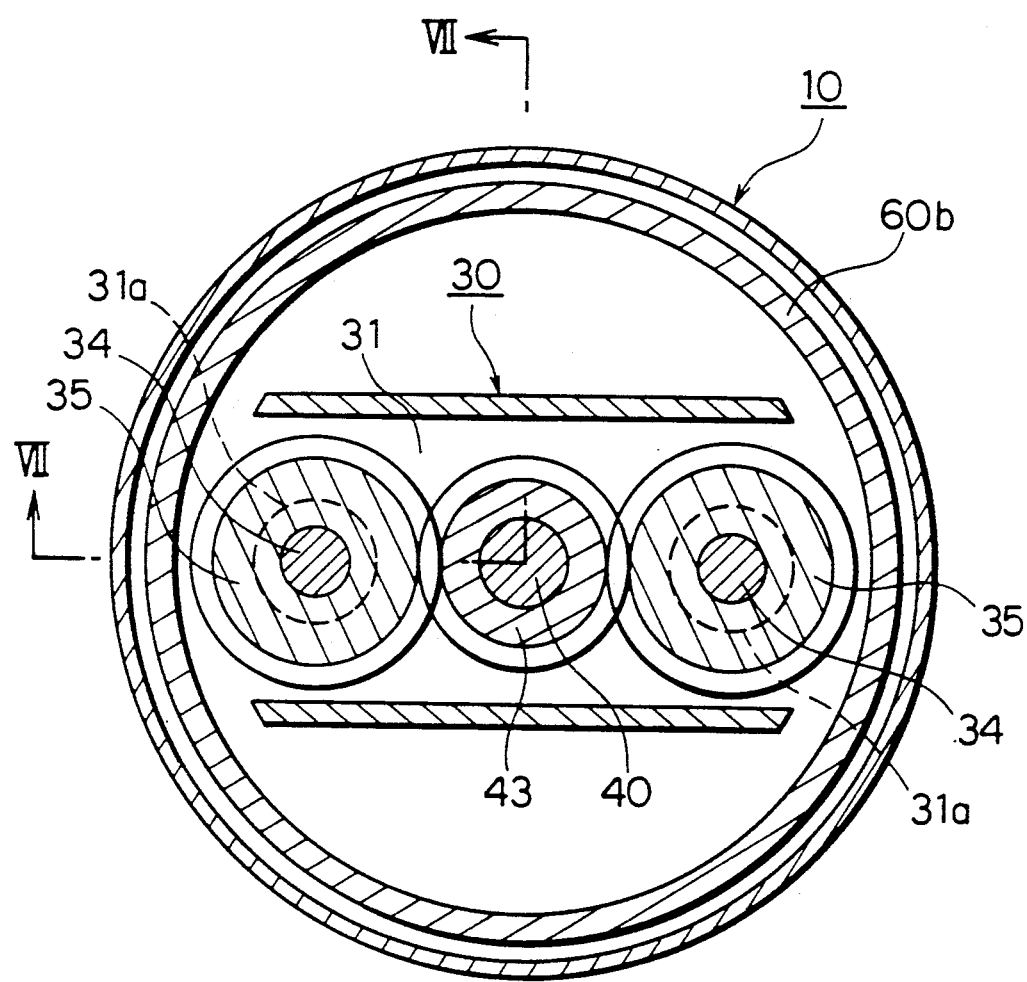

A first carrier 20 is formed of the first rotation member 21 and a rectangular side plate 22 which is attached integrally to the first rotation member 21 across an axial gap via a pair of axially extending plates to form a radially open box-structure (see FIGS. 7 and 9). Likewise, a second carrier 30 is formed of the second rotation member 31 and a rectangular side plate 32 which is attached integrally to the rotation member 31 across an axial gap via a pair of axially extending plates to form a radially open box-structure (see FIGS. 7 and 10). A first sun gear 41, disposed within the first carrier 20, is supported on the input shaft 40 via a bearing 42 provided with the one-way clutch mechanism, such that the first sun gear 41 is rotatable only in the counterclockwise direction (the direction opposite to the predetermined rotational direction) relative to the input shaft 40. On the other hand, a second sun gear 43, disposed within the second carrier 30, is fixed on the input shaft 40. A pair of first planetary gears 25, fixed on the planetary shafts 24 rotatably carried by the first carrier 20, mesh with the first sun gear 41, such that the first planetary gears 25 are capable of planetary motions around the first sun gear 41. The shafts 24 of the first planetary gears 25 are rotatably supported on the first carrier 20 via the bearings 21a and 22a, at an equal eccentricity with respect to the input shaft 40. A pair of second planetary gears 35, fixed on the planetary shafts 34 rotatably carried by the second carrier 30, mesh with the second sun gear 43, such that the second planetary gears 35 are capable of planetary motion around the second sun gear 43. The shafts 34 of the second planetary gears 35 are rotatably supported on the second carrier 30 via a pair of bearings 31a and 32a, at an equal eccentricity with respect to the input shaft 40.

To the respective output side ends of the shafts 24 of the first planetary gears 25 are fixed first satellite shafts 26 to extend axially therefrom with a predetermined eccentricity with respect to the respective central axes of the planetary gear shafts 24. Likewise, to the input side ends of the shafts 34 of the second planetary gears 35 are fixed second satellite shafts 36 with a predetermined eccentricity (equal to the above eccentricity of the first satellite shafts 26 with respect to the central axes of the first planetary gear shafts 24) with respect to the respective central axes of the second planetary gear shafts 34. Further, first satellite rings 28 are rotatably and concentrically supported on satellite shafts 26 via bearings 27. Likewise, second satellite rings 38 are rotatably and concentrically supported on satellite shafts 36 via bearings 37. A guide disk 50, rotatably supported on the input shaft 40 via a bearing 51, has four equally spaced radially extending satellite guide slots 52 (see FIG. 8), antipodal two of which slidably engage with the first satellite rings 28 and the other antipodal two of which slidably engage with the second satellite rings 38. The first and the second sun gears 41 and 43 have the same number of teeth, and likewise the first and the second planetary gears 55 and 65 have the same number of teeth.

Figure 12B:
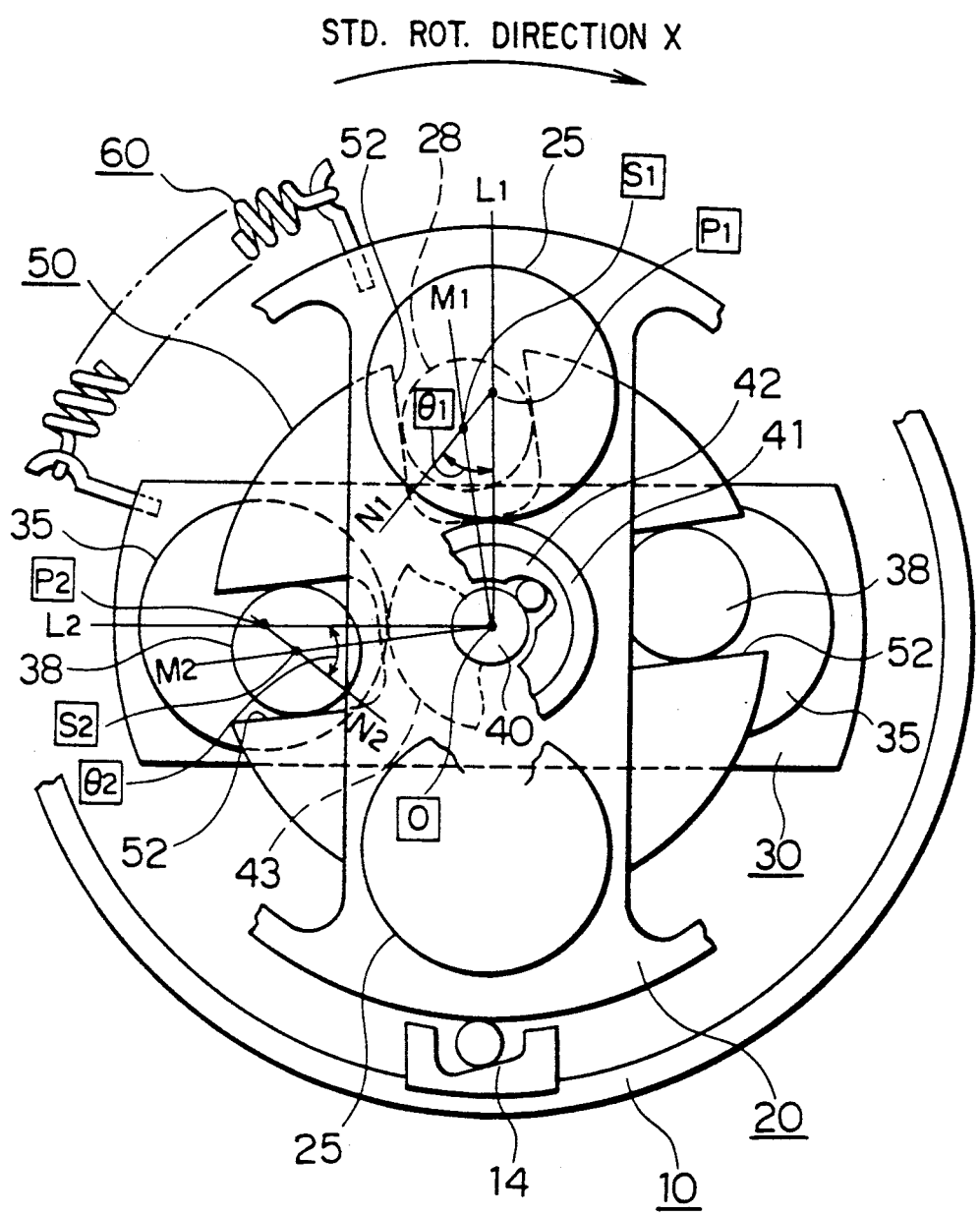

Next, the method of operation of the above torque transmission mechanism according to the second embodiment is described by reference to FIGS. 11a, 11b, 12a and 12b, which schematically show the mechanism as viewed from the input side (from the direction of the arrow A in FIG. 7). FIG. 11(a) and 11(b) show the mechanism in the first and the second asynchronous modes; FIG. 12(a) shows the mechanism in the non-operating initial state and FIG. 12(b) shows the mechanism in the state where the torque limiting function of the mechanism is in operation. In FIGS. 11 and 12, each gear is represented by means of its pitch circle and the center. Since the first and the second sun gears 41 and 43 completely overlap with each other, they are shown in partial representations. The bearings 14 and 42 having the one-way clutch function are represented schematically so as to show their functions clearly. Thus, the bearing 14 supports the first rotation carrier 20 on the housing 10 in such a manner that the carrier 20 is rotatable only in the clockwise direction (standard direction X) relative to the stationary housing 10; on the other hand, the bearing 42 supports the first sun gear 41 on the input shaft 40 in such a manner that the sun gear 41 is rotatable only in the counterclockwise direction (the direction opposite to the standard direction X) relative to the input shaft 40. Further, the annular torsional member 60 is schematically shown in the form of a helical tension spring to represent the function thereof schematically and clearly.

The meanings of the reference characters, etc., in FIGS. 11a, 11b, 12a and 12b are as follows:

direction X is the standard rotational direction (clockwise as viewed from the input side);

point O is the sun center or the center of the input shaft 40;

points P1 and P2 are the centers of the first and the second planetary shafts 24 and 34, respectively;

points S1 and S2 are the centers of the first and the second satellite shafts 26 and 36, respectively;

line L1 is the radius which connects the sun center O and the planetary center P1;

line M1 is the radius which connects the sun center O and the satellite center S1 and which is the central radial line of the guide slot 52 engaging with the first satellite ring 28;

line N1 is the line which connects the points P1 and S1, i.e., the revolutionary radius of the first satellite ring 28 around the planetary center P1;

angle $\theta 1$ represents the angle $\angle OP1S1$ formed by the lines L1 and N1, i.e., the rotational angle of the first planetary gear 25 (or the revolutional angle of the first satellite ring 28) with respect to the radius L1 connecting the sun center O to the planetary center P1, wherein the angle $\theta 1$ is measured positive in the direction of rotation of the first planetary gears 25 around the center P1 (i.e., in the counterclockwise direction), such that $\theta 1$ falls between $-180°$ and $+180°$;

line L2 is the radius which connects the sun center O to the planetary center P2;

line M2 is the radius which connects the center O to the point S2 and which is the central radial line of the guide slot 52 engaging with the second satellite ring 38;

line N2 is the line which connects the points P2 and S2, i.e., the revolutionary radius of the second satellite ring 38 around the planetary center P2;

angle $\theta 2$ represents the angle $\angle OP2S2$ formed by the lines L2 and N2, i.e., the rotational angle of the second planetary gear 35 (or the revolutional angle of the second satellite ring 38) with respect to the radius L2 connecting the sun center O to the planetary center P2, wherein angle $\theta 2$ is measured positive in the direction of rotation of the second planetary gears 35 around the center P2 (counterclockwise), such that $\theta 2$ falls between $-180°$ and $+180°$.

As in the case of the first embodiment, the mechanism is said to be in a synchronous state when the above-defined angles $\theta 1$ and $\theta 2$ are equal in magnitude and sign ($\theta 1 = \theta 2$); the mechanism is said to be in an asynchronous state, when the angles $\theta 1$ and $\theta 2$ are different from each other ($\theta 1 \neq \theta 2$). The modes of operation are different according to whether the mechanism is in a synchronous or an asynchronous state, and, when it is in an asynchronous state, according to whether $\cos \theta 1$ is greater than $\cos \theta 2$ ($\cos \theta 1 > \cos \theta 2$), referred to as the first asynchronous mode, or $\cos \theta 1$ is smaller than $\cos \theta 2$ ($\cos \theta < \cos \theta 2$), referred to as the second asynchronous mode.

Referring first to FIG. 11(a), the first asynchronous mode operation of the transmission mechanism according to the second embodiment is described. In the state shown in FIG. 11(a), let us make the fundamental assumption that:

(1) the output shaft 33 and hence the second carrier 30 (and the second rotation member 31) remains stationary. Further let us make (at least for the present) a further assumption (2) that (2a) the first carrier 20 (and the first rotation member 21) also remains stationary, and that (2b) the first sun gear 41 rotates at the same speed with the second sun gear 43 (i.e., the first sun gear 41 is stationary relative to the input shaft 40).

Under these assumptions (1) and (2), the first and the second planetary gears 25 and 35 rotate counterclockwise around the respective centers P1 and P2 thereof at the same rotational velocity, the centers P1 and P2 of the first planetary gears 25 and the second planetary gears 35 being stationary. Thus, the satellite centers S1 and S2 revolve around the stationary centers P1 and P2, respectively, at the same revolutional velocity. Due to the revolutions around the respective centers P1 and P2, the satellite centers S1 and S2 come to possess angular velocities around the sun center O which are proportional to $\cos \theta 1$ and $\cos \theta 2$, respectively, and inversely proportional to the length of the radius OS1 or OS2, respectively. (In the case shown in FIG. 11(a), the angular velocity of the point S1 around the sun center O is clockwise, while that of the point S2 around the sun center O is counterclockwise.) Since the lengths of the radii OS1 and OS2 are substantially constant and equal to each other, the angular velocity of points S1 and S2 around the sun center O can be regarded to be substantially proportional to the magnitudes of $\cos \theta 1$ and $\cos \theta 2$, respectively. Thus, the revolutional angular velocity of the points S1 and S2 around the sun center O vary periodically with the passage of time.

Thus, if the mechanism is in the first asynchronous state where $\cos \theta 1$ is greater than $\cos \theta 2$ ($\cos \theta 1 > \cos \theta 2$) as shown in FIG. 11(a), and if the above assumptions (1) and (2) are both maintained, the angular velocity of the point S1 around the sun center O becomes greater than that of the point S2 around the sun center O. This consequence, however, is impossible. Namely, the points S1 and S2 lie on the central radial lines M1 and M2, respectively, of the guide slots 52 of the guide disk 50, and hence the angle $\angle S1OS2$ should remain constant (equal to a right angle in the case of the embodiment). Thus, if the assumption (1) is maintained, either (2a) or (2b) of the second assumption (2) should be discarded. In the case shown in FIG. 5(a), the angular velocity of the point S1 around the sun center O should be reduced to that of the point S2. This can be effected either by reducing the rotational velocity of the first sun gear 41 or by rotating the first carrier 20 in the counterclockwise direction. The latter however is impossible due to the function of the one-way clutch of the bearing 14. The former, on the other hand, is possible in view of the free-rotational direction of the one-way clutch of the bearing 42. Thus, the assumption (2b) should be discarded.

Thus the method of operation of the mechanism in the first asynchronous mode may be summarized as follows: When the input shaft 40 is driven, the second planetary gears 35 are driven via the second sun gear 43 fixed on the input shaft 40. The movements of the second planetary gears 35 entail the movements of the second satellite rings 38. The guide disk 50 engaging with the satellite rings 38 is thus rotated in accordance with the rotational velocity of the second planetary gears 35. Due to the constraint acting on the first planetary gears 25 from the guide disk 50 via the first satellite rings 28, the first sun gear 41 slips in the counterclockwise direction relative to the input shaft 40 while the first carrier 20 remains stationary due to the action of the one-way clutch bearing 14. Thus, during the first asynchronous mode, the torsion of the torsional resilient member 60 remains constant while the difference between the angles $\theta 1$ and $\theta 2$ is reduced.

FIG. 11(b) represents the transmission mechanism in the second asynchronous mode where $\cos \theta 1$ is less than $\cos \theta 2$ ($\cos \theta 1 < \cos \theta 2$). If we make the same assumptions (1) and (2), an argument similar to the above leads to an impossible conclusion that the revolutional angular velocity of the first satellite centers S1 around the sun center O in the clockwise direction is smaller than that of the second satellite centers S2. (As described above, the angle formed by the lines OS1 and OS2 is fixed—equal to a right angle—since the lines OS1 and OS2 are the central radial lines of the guide slots 52 of the guide disk 50.) In order to increase the revolutional velocity of the first satellite centers S1 around the sun center O, either the rotational velocity of the first sun gear 41 should be increased, or the first carrier 20 should be rotated in the clockwise standard direction X. In view of the one-way clutch function of the bearings 14 and 42, only the latter alternative is possible. Namely, we are forced to discard the first (2a) of the second assumption (2).

Thus the method of operation of the mechanism in the second asynchronous mode where $\cos\theta_1 < \cos\theta_2$ may be summarized as follows: When the input shaft 40 is driven, the second planetary gears 35 are driven via the second sun gear 43 fixed on the input shaft 40. The movements of the second planetary gears 35 entail the movements of the second satellite rings 38. The guide disk 50 engaging with the satellite rings 38 is thus rotated in accordance with the rotational velocity of the second planetary gears 35. Due to the constraint acting on the first planetary gears 25 from the guide disk 50 via the first satellite rings 28, the first carrier 20 rotates in the clockwise direction relative to the second carrier 30 while the first sun gear 40 is stationary relative to the input shaft 40 and rotates together therewith, due to the one-way clutch function of the bearing 42. Thus, during the second asynchronous mode, the angular displacement of the first rotation member 21 with respect to the second rotation member 31 increases, thereby increasing the torsional torque of the torsional resilient member 60 acting between the first and second rotation members 21 and 31; further, the difference between the angles $\theta_1$ and $\theta_2$ is reduced.

Thus, both in the first and the second asynchronous modes, the first planetary gears 25 rotate in the clockwise direction relative to the second planetary gears 35, thereby reducing the difference between the angles $\theta_1$ and $\theta_2$. Consequently, if the mechanism is in the asynchronous state (i.e., $\theta_1 \neq \theta_2$), the operation of the mechanism continuously reduces the difference between the angles $\theta_1$ and $\theta_2$, the mechanism thereby tending toward the synchronous state ($\theta_1 = \theta_2$).

FIG. 12(a) shows the mechanism according to the second embodiment in the initial non-operating state. Namely, the angular displacement of the first carrier 20 in the clockwise direction relative to the second carrier 30 is at the minimum (i.e., the rotational displacement of the first rotation member 21 relative to the second rotation member 31 is null), and hence the resilient member 60 exerts null torsional torque between the first and the second rotation members 20 and 30. On the other hand, the angle $\theta_1$ is greater than the angle $\theta_2$ ($\theta_1 > \theta_2$), and the mechanism is in an asynchronous state. Thus, when the input shaft 40 is driven in the clockwise standard direction X, the mechanism is operated alternately in the first and the second asynchronous modes, as described above by reference to FIGS. 11(a) and 11(b). Namely, if the mechanism is initially in the first asynchronous mode, then it passes into the second asynchronous mode, and alternates between the first and the second asynchronous mode operations thereafter. During the first asynchronous mode periods, the rotational displacement of the first rotation member 21 (the first carrier 20) relative to the second rotation member 31 (the second carrier 30), and hence the torsional torque exerted by the torsional resilient member 60 therebetween, remains constant. On the other hand, during the second asynchronous mode periods, the first rotation member 21 is rotated in the clockwise direction relative to the second rotation member 31 such that the torsional torque exerted by the torsional resilient member 60 increases. Consequently, the torsional torque of the resilient member 60 is accumulated.

The output shaft 33 integral with the second rotation member 31 is thus acted on by an increasing output torque equal to the torsional torque exerted by the resilient member 60 from the first rotation member 21 to the second rotation member 31. The reaction of the output torque acts partially on the input shaft 40. However, it is grounded in the main part thereof on the housing 10 via the one-way clutch mechanism of the bearing 14. When the increasing output torque thus increases to become equal to (or greater than) the torque acting on the output shaft 33 from an exterior load (not shown), the output shaft 33 begins to rotate together with the load. Otherwise, the output torque increases until the mechanism finally reaches the synchronous state where the output torque takes its predetermined maximum.

FIG. 12(b) shows the mechanism in the final synchronous state in which the output torque is at the predetermined maximum and the torque limiting function according to this invention is in operation. In the final synchronous state, the rotational displacement of the first carrier 20 relative to the second carrier 30 is at the maximum, such that the resilient member 60 exerts a predetermined maximum torsional torque from the first rotation member 21 to the second rotation member 31. The reaction of the output torque in this state acts on and is grounded by the housing 10 in its totality via the first carrier 20 and the one-way clutch function of the bearing 14, rather than acting on the input shaft 40. Since the mechanism is in the synchronous state ($\theta_1 = \theta_2$), the above assumptions (1) and (2) ((2a) and (2b)) can be satisfied simultaneously. Thus, the relative position of the first and the second carriers 20 and 30 remains the same, while all the gears of the mechanism continue to rotate without transmitting torque therebetween. Once the mechanism reaches the synchronous torque limiting state, it is retained in such state unless the load torque acting on the output shaft 33 becomes less than the predetermined maximum torque.

As described above, although the predetermined maximum torque acts on the output shaft 33 in the final synchronous torque limiting operation mode, the reaction on the input shaft 40 is null in principle. Thus, so long as the output shaft 33 remains stationary, the motive power or energy is not dissipated, in principle, regardless of how fast or how long the input shaft is rotated.

The principle of this invention is applicable to transmission devices other than the first and the second embodiments described above. For example, in the case of the above embodiments, the first sun gear 41 is mounted on the input shaft 40 via a bearing 42 having the one-way clutch function, the second sun gear 43 being fixed on the input shaft 40. However, the first sun gear 41 may be fixed on the input shaft 40, the second sun gear 43 being mounted on the input shaft via a bearing having a one-way clutch function, provided that the locking and free-rotating directions of the one-way clutch bearing is selected appropriately. Further, the number of the first or the second planetary gears is not limited to two. The number of the first and the second planetary gears (and that of the first and the second satellite rings) may be one, two, three, four or more, and the number of the first planetary gears (or that of the first satellite gears) may be different from that of the second planetary gears (that of the second satellite gears). Further, in the case of the above embodiments, the satellite shafts are secured on the ends of the planetary shafts. However, when the eccentricity of the satellite shafts with respect to the respective axes of the planetary shafts is selected at a greater value, the satellite shafts may be secured on the side surfaces of the planetary gears. Furthermore, in the case of the above embodiments, the guide slots of the guide disk engaging with the satellite rings extend radially straight (along the radially straight directions M1 and M2). However, the whole or a part thereof may be curved. Further, in the case of the above embodiments, the guide slots of the guide disk slidably engage with the satellite shafts via annular satellite rings rotatably supported on the satellite shafts. However, the guide slots of the guide disk may directly and slidably engage with the satellite shafts, or, even if satellite rings are utilized, they may take forms other than that of the annular rings, which forms may comprise planar or curved surfaces matching with the forms of the side surfaces of the guide slots of the guide disk. Further, the first and the second carriers for carrying the planetary gears may take many well-known forms, provided that they are capable of supporting the planetary gears to allow planetary motions.

The principle of this invention, by which a gear transmission mechanism is utilized for limiting the transmitted torque and hence no energy is dissipated, is completely different from that of the conventional torque limiting transmission devices in which the torque is limited by means of a frictional sliding contact. Since the amount of heat generated by friction is negligible, the reliability and the durability of the device is greatly enhanced. The transmission device according to this invention thus provides an ideal flexible joint which is applicable to a wide variety of torque transmission systems. For example, in the relatively dynamic application field, the device according to this invention provides an ideal transmission in the case where electric motors or internal combustion engines, which intrinsically have constant rpm characteristics, are utilized as the prime mover for industrial machines or automobiles, whose rotational speeds are to be varied over a wide range. The relatively static application fields include those of torque multiplier devices, winding devices, or various types of screw fastener devices.

What is claimed is:

1. A rotation transmission device for transmitting a torque in a predetermined rotational direction with a torque limiting function, comprising:
   a hollow cylindrical housing having two ends closed by a first and a second bracket, respectively;
   a first rotation member concentrically disposed within said housing and supported by said first bracket of the housing such that it is rotatable only in said predetermined rotational direction;
   an output shaft rotatably supported by said second bracket of the housing;
   a second rotation member concentrically disposed within said housing and connected integrally to said output shaft and rotatably supported by said second bracket of the housing, said first and second rotation members opposing each across an axial length within said housing;
   an annular torsional resilient member connecting the first and the second rotation members across said axial length, said torsional resilient member exerting between the first and the second rotation members a torsional torque proportional to a relative rotational displacement of the first rotation member with respect to the second rotation member;
   an input shaft driven in said predetermined rotational direction and concentrically extending within said first and second rotation members to be rotatably supported by said first and second rotation members; and
   a torque transmission mechanism for transmitting torque from the input shaft to the first rotation member while the torsional torque exerted by said torsional resilient member from the first to the second rotation member in said predetermined rotational direction is below a predetermined magnitude, said torque transmission mechanism limiting under the predetermined magnitude the torque transmitted from the first to the second rotation member.

2. A rotation transmission device as claimed in claim 1, wherein said torque transmission mechanism comprises:
   a first internal gear formed integrally with said first rotation member to extend axially therefrom toward the second rotation member;
   a second internal gear formed integrally with said second rotation member to extend axially therefrom toward the first rotation member;
   a first sun gear supported concentrically on said input shaft in axial alignment with said first internal gear;
   a second sun gear supported concentrically on said input shaft in axial alignment with said second internal gear, wherein: the first sun gear is supported on the input shaft such that it is rotatable only in a direction opposite to said predetermined rotational direction while the second sun gear is fixed on the input shaft;
   a plurality of first planetary gears meshing with said first sun gear and first internal gear and rotatably supported at an equal eccentricity with respect to the input shaft on a first carrier rotatably supported on the input shaft, such that the first planetary gears are capable of planetary motion around the first sun gear;
   a plurality of second planetary gears meshing with said second sun gear and second internal gear and rotatably supported at an equal eccentricity with respect to the input shaft on a second carrier rotatably supported on the input shaft, such that the second planetary gears are capable of planetary motion around the second sun gear;
   first satellite shafts secured on and extending axially from respective first planetary gears with an eccentricity with respect to respective axes of rotation of the first planetary gears;
   second satellite shafts secured on and extending from respective second planetary gears with an eccentricity with respect to respective axes of rotation of the second planetary gears, the eccentricity of the second satellite shafts with respect to the respective axes of the second planetary gears being equal to the eccentricity of the first satellite shafts with respect to the respective axes of the first satellite gears; and
   a disk-shaped guide member rotatably supported on the input shaft between said first and second rotation members and having radially extending guide slots slidably engaging with said first and second satellite shafts, such that a torque in said predetermined direction is transmitted via the guide member while the torque is below said predetermined magnitude.

3. A rotation transmission device as claimed in claim 2, wherein said guide slots of the guide member engage with said first and second satellite shafts via satellite rings rotatably and concentrically supported on the satellite shafts.

4. A rotation transmission device as claimed in claim 2, wherein revolutional angles of the first satellite shafts around respective axes of the first planetary gears are initially different from revolutional angles of the second satellite shafts around respective axes of the second planetary gears.

5. A rotation transmission device as claimed in claim 1, wherein said torque transmission mechanism comprises:
   a first sun gear concentrically supported on said input shaft;
   a second sun gear concentrically supported on said input shaft, the first sun gear is supported on the input shaft such that it is rotatable only in a direction opposite to said predetermined rotational direction while the second sun gear is fixed on the input shaft;
   a plurality of first planetary gears meshing with said first sun gear and rotatably supported at an equal eccentricity with respect to the input shaft on a first carrier formed integrally with said first rotation member, such that the first planetary gears are capable of planetary motion around the first sun gear;
   a plurality of second planetary gears meshing with said second sun gear and rotatably supported at an equal eccentricity with respect to the input shaft on a second carrier formed integrally with said second rotation member, such that the second planetary gears are capable of planetary motion around the second sun gear;
   first satellite shafts secured on and extending axially from respective first planetary gears with an eccentricity with respect to respective axes of rotation of the first planetary gears;
   second satellite shafts secured on and extending from respective second planetary gears with an eccentricity with respect to respective axes of rotation of the second planetary gears, the eccentricity of the second satellite shafts with respect to the respective axes of the second planetary gears being equal to the eccentricity of the first satellite shafts with respect to the respective axes of the first planetary gears; and
   a disk-shaped guide member rotatably supported on the input shaft between said first and second rotation members and having radially extending guide slots slidably engaging with said first and second satellite shafts, such that a torque in said predetermined direction is transmitted via the guide member while the torque is below said predetermined magnitude.

6. A rotation transmission device as claimed in claim 5, wherein said guide slots of the guide member engage with said first and second satellite shafts via satellite rings rotatably and concentrically supported on the satellite shafts.

7. A rotation transmission device as claimed in claim 5, wherein revolutional angles of the first satellite shafts around respective axes of the first planetary gears are initially different from revolutional angles of the second satellite shafts around respective axes of the second planetary gears.

* * * * *